United States Patent
Yamamoto et al.

(10) Patent No.: US 8,538,616 B2
(45) Date of Patent: *Sep. 17, 2013

(54) POWER SUPPLY SYSTEM FOR ELECTRICALLY POWERED VEHICLE, ELECTRICALLY POWERED VEHICLE, AND METHOD FOR CONTROLLING THE SAME

(75) Inventors: Masaya Yamamoto, Kasugai (JP); Norihiko Kato, Handa (JP); Haruki Sato, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 139 days.

This patent is subject to a terminal disclaimer.

(21) Appl. No.: 13/126,403

(22) PCT Filed: Oct. 31, 2008

(86) PCT No.: PCT/JP2008/069871
§ 371 (c)(1),
(2), (4) Date: Jun. 28, 2011

(87) PCT Pub. No.: WO2010/050045
PCT Pub. Date: May 6, 2010

(65) Prior Publication Data
US 2011/0251745 A1 Oct. 13, 2011

(51) Int. Cl.
*B60L 9/00* (2006.01)
*B60L 11/00* (2006.01)
*G05D 1/00* (2006.01)
*G05D 3/00* (2006.01)
*G06F 7/00* (2006.01)
*G06F 17/00* (2006.01)

(52) U.S. Cl.
USPC .......................................................... 701/22

(58) Field of Classification Search
USPC .................... 701/22, 54; 180/65.21, 65.265, 180/65.245, 65.25, 65.23, 65.28, 65.29; 903/930, 904, 907, 906, 905
See application file for complete search history.

(56) References Cited

U.S. PATENT DOCUMENTS

| 6,047,787 A | 4/2000 | Deng et al. |
| 6,608,396 B2 | 8/2003 | Downer et al. |

(Continued)

FOREIGN PATENT DOCUMENTS

| CN | 101253089 A | 8/2008 |
| EP | 1 920 985 A1 | 5/2008 |

(Continued)

OTHER PUBLICATIONS

Non-final Office Action dated Apr. 26, 2012 in U.S. Appl. No. 13/003,727.

(Continued)

*Primary Examiner* — Mary Cheung
*Assistant Examiner* — Frederick Brushaber
(74) *Attorney, Agent, or Firm* — Sughrue Mion, PLLC

(57) ABSTRACT

A power supply system includes a main power storage device and a plurality of sub power storage devices. A converter is connected to selected one of the sub power storage devices to convert voltage between the selected sub power storage device and an electric power feeding line bidirectionally. When the travel mode of an electrically powered vehicle is an EV mode, switching processing of a sub power storage device is performed based on the selected sub power storage device's SOC. On the other hand, when the travel mode of the electrically powered vehicle is an HV mode, control under which the SOC of the main power storage device and the plurality of sub power storage devices as a whole is kept constant is carried out, and switching of the selected sub power storage device is prohibited.

13 Claims, 12 Drawing Sheets

(56) References Cited

U.S. PATENT DOCUMENTS

| | | |
|---|---|---|
| 8,004,109 B2 | 8/2011 | Komatsu |
| 2003/0107352 A1 | 6/2003 | Downer et al. |
| 2003/0139859 A1 | 7/2003 | Hanada et al. |
| 2007/0247106 A1 | 10/2007 | Kawahara et al. |
| 2008/0185197 A1 | 8/2008 | Nakamura et al. |
| 2009/0058326 A1 | 3/2009 | Oyobe et al. |
| 2009/0277701 A1 | 11/2009 | Soma et al. |
| 2010/0038962 A1 | 2/2010 | Komatsu |
| 2010/0096918 A1 | 4/2010 | Sawada et al. |
| 2010/0121507 A1 | 5/2010 | Ishii et al. |
| 2010/0296204 A1 | 11/2010 | Ichikawa et al. |
| 2011/0040436 A1* | 2/2011 | Yamamoto et al. .......... 701/22 |
| 2011/0066311 A1 | 3/2011 | Itagaki |
| 2011/0087395 A1* | 4/2011 | Yamamoto et al. .......... 701/22 |
| 2011/0178664 A1* | 7/2011 | Yamamoto et al. .......... 701/22 |
| 2011/0208383 A1* | 8/2011 | Yamamoto et al. .......... 701/22 |
| 2011/0251745 A1* | 10/2011 | Yamamoto et al. .......... 701/22 |
| 2011/0257825 A1* | 10/2011 | Yamamoto et al. .......... 701/22 |
| 2012/0010771 A1* | 1/2012 | Kato et al. .......... 701/22 |
| 2012/0016549 A1 | 1/2012 | Katsumata et al. |
| 2012/0022738 A1* | 1/2012 | Kato et al. .......... 701/22 |
| 2012/0089290 A1* | 4/2012 | Kato et al. .......... 701/22 |

FOREIGN PATENT DOCUMENTS

| | | |
|---|---|---|
| JP | 2003-209969 A | 7/2003 |
| JP | 2004-359032 A | 12/2004 |
| JP | 2006-077641 A | 3/2006 |
| JP | 2007-062589 | 3/2007 |
| JP | 2007-062639 A | 3/2007 |
| JP | 2007-098981 A | 4/2007 |
| JP | 2007-269249 A | 10/2007 |
| JP | 2007-282375 A | 10/2007 |
| JP | 2008-109840 A | 5/2008 |
| JP | 2008-154439 A | 7/2008 |
| JP | 2008-167620 A | 7/2008 |
| JP | 2008-220084 A | 9/2008 |

OTHER PUBLICATIONS

Final Office Action dated Sep. 11, 2012 in U.S. Appl. No. 13/003,727.

Notice of Allowance dated Nov. 28, 2012 in U.S. Appl. No. 13/003,727.

Notice of Allowance dated Jun. 25, 2013 in corresponding U.S. Appl. No. 13/003,727.

Notice of Allowance dated Jun. 24, 2013 in corresponding U.S. Appl. No. 13/259,445.

* cited by examiner

POWER SUPPLY SYSTEM FOR ELECTRICALLY POWERED VEHICLE, ELECTRICALLY POWERED VEHICLE, AND METHOD FOR CONTROLLING THE SAME

CROSS REFERENCE TO RELATED APPLICATION

This application is a National Stage of International Application No. PCT/JP2008/069871 filed Oct. 31, 2008, the contents of all of which are incorporated herein by reference in their entirety.

TECHNICAL FIELD

The present invention relates to a power supply system for an electrically powered vehicle and a method for controlling the same, and more particularly to control of a power supply system of an electrically powered vehicle having a main power storage device and a plurality of sub power storage devices mounted thereon.

BACKGROUND ART

In recent years, as an environmentally friendly vehicle, electrically powered vehicles such as electric cars, hybrid cars and fuel cell cars have been developed into practical use. These electrically powered vehicles have mounted thereon an electric motor generating force to drive the vehicle and a power supply system for supplying electric power to drive the motor, that is configured to include a power storage device.

In particular for hybrid cars, there has been proposed a configuration charging a vehicle-mounted power storage device by a power supply external to the vehicle (hereinafter also referred to as an "external power supply"), and accordingly, these electrically powered vehicles require increased distances travelable on electric power stored in the vehicle-mounted power storage device. Hereinafter, charging a vehicle-mounted power storage device by an external power supply will also simply be referred to as "external charging".

For example, Japanese Patent Laying-Open No. 2008-109840 (Patent Document 1) and Japanese Patent Laying-Open No. 2003-209969 (Patent Document 2) describe a power supply system having a plurality of power storage devices (batteries) connected in parallel. The power supply system described in Patent Documents 1 and 2 is provided with a voltage converter (a converter) for each power storage device (battery) as a charging/discharging adjustment mechanism. In contrast, Japanese Patent Laying-Open No. 2008-167620 (Patent Document 3) describes a configuration of a power supply device in a vehicle having a main power storage device and a plurality of sub power storage devices mounted thereon, that provides a converter associated with a main power supply device and a converter shared by the plurality of sub power storage devices. This configuration can achieve a reduced number of elements in the device and also an increased storable amount of energy.

Furthermore, Japanese Patent Laying-Open No. 2006-77641 (Patent Document 4) describes a series/parallel hybrid electric car which has mounted thereon a control device for switching the driving state of a vehicle based on the vehicle speed and an SOC. The driving state includes a state in which an output from an engine (internal combustion engine) is used as motive power for traveling and a state in which motive power for traveling is obtained by stopping the engine and operating a motor.

Patent Document 1: Japanese Patent Laying-Open No. 2008-109840
Patent Document 2: Japanese Patent Laying-Open No. 2003-209969
Patent Document 3: Japanese Patent Laying-Open No. 2008-167620
Patent Document 4: Japanese Patent Laying-Open No. 2006-77641

DISCLOSURE OF THE INVENTION

Problems to be Solved by the Invention

In the power supply device described in Patent Document 3, one of the plurality of sub power storage devices is selectively connected to the converter to allow the main power supply device and the selected sub power storage device to supply electric power to drive an electric motor for driving a vehicle. In such a power supply device, when the sub power storage device in use has a decreased SOC, a different sub power storage device is connected to the converter to use the plurality of sub power storage devices sequentially to allow stored electric energy to be used to achieve increased electric vehicle (EV) travelable distance.

The spent sub power storage device has a low SOC value, and therefore is considered to be non-reconnectable to the converter during traveling of the vehicle. That is, switching of a sub power storage device to be connected to the converter during traveling of the electrically powered vehicle certainly decreases stored electric energy available for the electrically powered vehicle, which influences on EV traveling. For example, EV traveling may not be carried out (for instance, an engine may start in a case of a hybrid car) despite the fact that a user wants the electrically powered vehicle to carry out EV traveling. In order to avoid such a problem, it is necessary to appropriately perform a connection switching process for changing a sub power storage device to be used.

The present invention has been made to solve such problems and an object of the present invention is to appropriately perform a connection switching process for changing a sub power storage device to be used, in a power supply system configured to include a main power storage device and a plurality of sub power storage devices sharing a voltage converter (a converter).

Means for Solving the Problems

According to one aspect of the present invention, a power supply system for an electrically powered vehicle incorporating a motor for generating power to drive the vehicle includes a main power storage device, an electric power feeding line, a first voltage converter, a plurality of sub power storage devices provided in parallel to each other, a second voltage converter, a connection unit, and a switching control device. The electric power feeding line feeds electric power to an inverter for driving and controlling the motor. The first voltage converter is provided between the electric power feeding line and the main power storage device, and configured to convert voltage therebetween bidirectionally. The second voltage converter is provided between the plurality of sub power storage devices and the electric power feeding line, and configured to convert voltage between one of the plurality of sub power storage devices and the electric power feeding line bidirectionally. The connection unit is provided between the plurality of sub power storage devices and the second voltage converter, and configured to selectively connect a sub power storage device selected from the plurality of sub power storage devices to the second voltage converter. The switching control device is configured to control selective connection between the plurality of sub power storage devices and the second voltage converter. The switching control device includes a switching determination unit and a connection switching unit. The switching determination unit determines whether the selected sub power storage device should be switched based on a state of charge of each of the plurality of sub power storage devices. The connection switching unit is configured to switch connection between the plurality of sub power storage devices and the second voltage converter when the switching determination unit determines that the selected sub power storage device should be switched. The switching determination unit determines that the selected sub power storage device should not be switched regardless of the state of charge of the selected sub power storage device, when receiving a switching prohibit instruction.

Preferably, the electrically powered vehicle includes an internal combustion engine configured to be able to generate the power to drive the vehicle independently of the motor and a charging and discharging control unit. The charging and discharging control unit sets a travel mode of the electrically powered vehicle based on a total required power of the electrically powered vehicle either in a first mode allowing the motor to generate the power to drive the vehicle or in a second mode allowing the motor and the internal combustion engine to generate the power to drive the vehicle. The charging and discharging control unit controls charging and discharging to and from the main power storage device and the plurality of sub power storage devices in accordance with the travel mode set. The switching determination unit receives the switching prohibit instruction from the charging and discharging control unit while the travel mode is the second mode.

Preferably, remaining capacity of the main power storage device and the plurality of sub power storage devices as a whole is controlled by the charging and discharging control unit to be kept constant in the second mode.

According to another aspect of the present invention, an electrically powered vehicle includes a motor, an inverter, an electric power feeding line, a main power storage device, a first voltage converter, a plurality of sub power storage devices provided in parallel to each other, a second voltage converter, a connection unit, and a control device. The motor generates power to drive the vehicle. The inverter drives and controls the motor. The electric power feeding line feeds electric power to the inverter. The first voltage converter is provided between the electric power feeding line and the main power storage device, and configured to convert voltage therebetween bidirectionally. The second voltage converter is provided between the plurality of sub power storage devices and the electric power feeding line, and configured to convert voltage between one of the plurality of sub power storage devices and the electric power feeding line bidirectionally. The connection unit is provided between the plurality of sub power storage devices and the second voltage converter, and configured to selectively connect a sub power storage device selected from the plurality of sub power storage devices to the second voltage converter. The control device controls at least the connection unit. The control device includes a switching determination unit and a connection switching unit. The switching determination unit determines whether the selected sub power storage device should be switched based on a state of charge of each of the plurality of sub power storage devices. The connection switching unit is configured to switch connection between the plurality of sub power storage devices and the second voltage converter when the switching determination unit determines that the selected sub power storage device should be switched. The switching determination unit determines that the selected sub power storage device should not be switched regardless of the state of charge of the selected sub power storage device, when receiving a switching prohibit instruction.

Preferably, the electrically powered vehicle further includes an internal combustion engine configured to be able to generate the power to drive the vehicle independently of the motor. The control device further includes a charging and discharging control unit. The charging and discharging control unit sets a travel mode of the electrically powered vehicle based on a total required power of the electrically powered vehicle either in a first mode allowing the motor to generate the power to drive the vehicle or in a second mode allowing the motor and the internal combustion engine to generate the power to drive the vehicle. The charging and discharging control unit controls charging and discharging to and from the main power storage device and the plurality of sub power storage devices in accordance with the travel mode set. The charging and discharging control unit generates the switching prohibit instruction while the travel mode is the second mode, and stops generation of the switching prohibit instruction while the travel mode is the first mode.

Preferably, the charging and discharging control unit controls the inverter and the internal combustion engine such that remaining capacity of the main power storage device and the plurality of sub power storage devices as a whole is kept constant in the second mode.

Preferably, the electrically powered vehicle further includes a travel mode setting device. The travel mode setting device has a first state and a second state corresponding to the first and second modes, respectively, and either one of the first and second states is configured to be manually settable. The charging and discharging control unit sets the travel mode based on the one state in the travel mode setting device.

According to still another aspect of the present invention, a method for controlling an electrically powered vehicle is provided The electrically powered vehicle includes a motor, an inverter, an electric power feeding line, a main power storage device, a first voltage converter, a plurality of sub power storage devices provided in parallel to each other, a second voltage converter, a connection unit, and a control device. The motor generates power to drive the vehicle. The inverter drives and controls the motor. The electric power feeding line feeds electric power to the inverter. The first voltage converter is provided between the electric power feeding line and the main power storage device, and configured to convert voltage therebetween bidirectionally. The second voltage converter is provided between the plurality of sub power storage devices and the electric power feeding line, and configured to convert voltage between one of the plurality of sub power storage devices and the electric power feeding line bidirectionally. The connection unit is provided between the plurality of sub power storage devices and the second voltage converter, and configured to selectively connect a sub power storage device selected from the plurality of sub power storage devices to the second voltage converter. The control device controls at least the connection unit. The method includes the steps of determining whether the selected sub power storage device should be switched based on a state of charge of each of the plurality of sub power storage devices and switching connection between the plurality of sub power storage devices and the second voltage converter when the step of determining determines that the selected sub power storage device should be switched. The step of determining determines that the selected sub power storage device should not be switched regardless of the state of charge of the selected sub power storage device, when switching of the selected sub power storage device is prohibited.

Preferably, the electrically powered vehicle further includes an internal combustion engine configured to be able to generate the power to drive the vehicle independently of the motor. The method further includes the steps of setting a travel mode of the electrically powered vehicle either in a first mode allowing the motor to generate the power to drive the vehicle or in a second mode allowing the motor and the internal combustion engine to generate the power to drive the vehicle, controlling charging and discharging to and from the main power storage device and the plurality of sub power storage devices in accordance with the travel mode set, and prohibiting switching of the selected sub power storage device when the step of setting sets the travel mode in the second mode.

Preferably, the step of controlling controls the inverter and the internal combustion engine such that remaining capacity of the main power storage device and the plurality of sub power storage devices as a whole is kept constant in the second mode.

Effects of the Invention

According to the present invention, in the power supply system configured to include a main power storage device and a plurality of sub power storage devices, with the plurality of sub power storage devices sharing a voltage converter (a converter), the connection switching process for changing a sub power storage device to be used can appropriately be performed.

DESCRIPTION OF THE REFERENCE SIGNS

Figure 1:
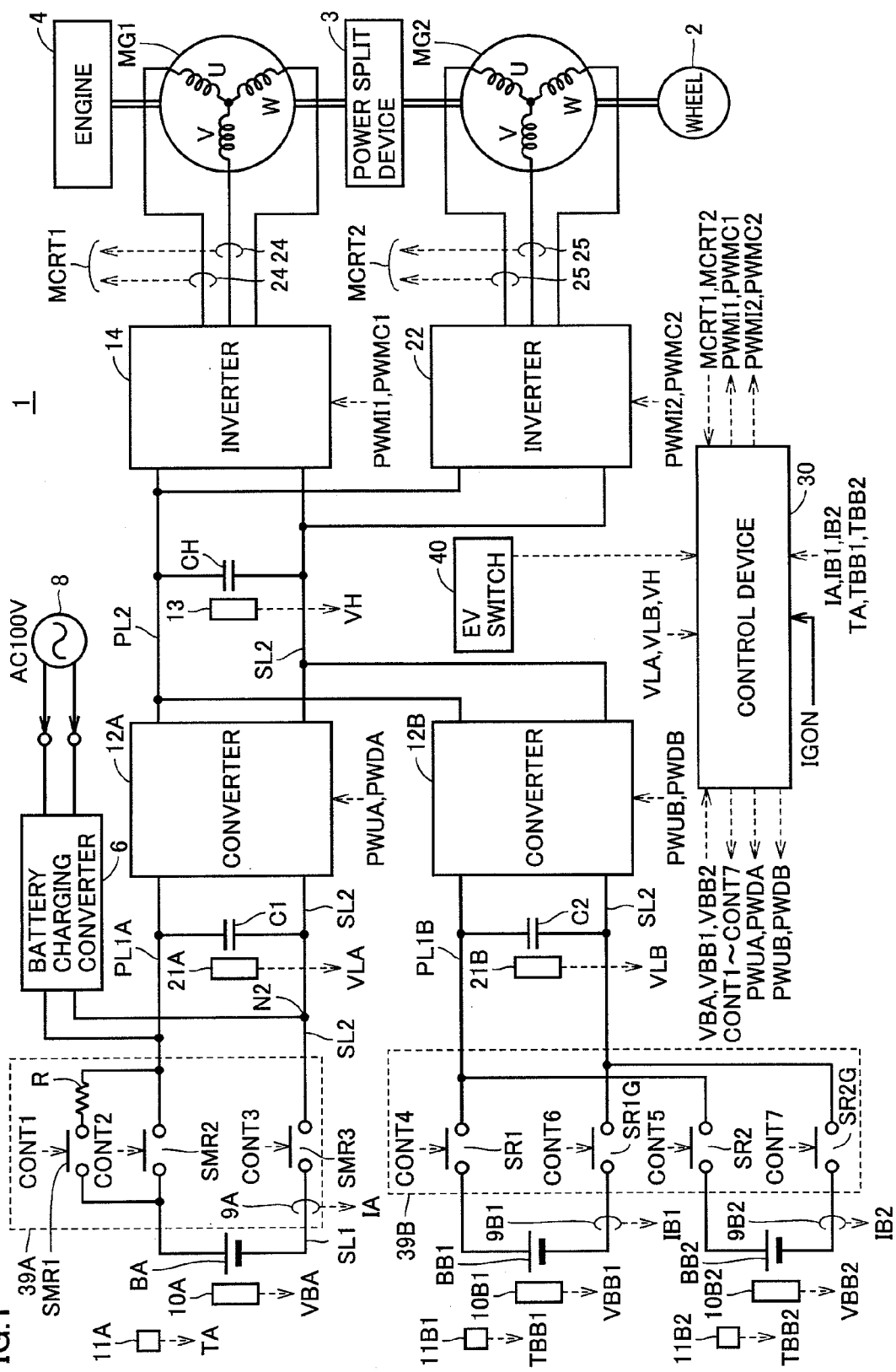
FIG. 1 is a diagram showing a main configuration of an electrically powered vehicle incorporating a power supply system according to an embodiment of the present invention.

1; 2 wheel; 3 power split device; 4 engine; 6 battery charging converter (external charging); 8 external power supply; 9A, 9B1, 9B2 current sensor; 10A, 10B1, 10B2, 13, 21A, 21B voltage sensor; 11A, 11B1, 11B2 temperature sensor; 12A converter (dedicated to main power storage device); 12B converter (shared by sub power storage devices); 14, 22 inverter; 15 to 17 each phase arm (U, V, W); 24, 25 current sensor; 30 control device; 39A connection unit (for main power storage device); 39B connection unit (for sub power storage device); 40 EV switch; 51 switching control unit; 52 charging/discharging control unit; 100 switching determination unit; 110 step-up-voltage instruction unit; 120 electric power limiter unit (for main power storage device); 130 electric power limiter unit (for sub power storage device); 140 connection control unit; 200 converter control unit; 250 traveling control unit; 260 total power calculation unit; 270, 280 inverter control unit; BA battery (main power storage device); BB selected sub power storage device; BB1, BB2 battery (sub power storage device); C1, C2, CH smoothing capacitor; CMBT step-up voltage command signal; CONT1 to CONT7 relay control signal; D1 to D8 diode; FBT flag (stepping up voltage completed); FLG flag (switching prohibit instruction); IA, IB1, IB2 input/output current (battery); ID variable (status of switching process); IGON start signal; L1 reactor; MCRT1, MCRT2 motor current value; MG1, MG2 motor-generator; N2 node; PL1A, PL1B power supply line; PL2 electric power feeding line; Pttl total required power; PWMI, PWMI1, PWMI2, PWMC, PWMC1, PWMC2 control signal (for inverter); PWU, PWUA, PWDA, PWD, PWDA, PWDB control signal (for converter); Q1 to Q8 IGBT device; R limiting resistor; SL1, SL2 ground line; SMR1 to SMR3 system main relay; SR1, SR1G, SR2, SR2G relay; TA, TBB1, TBB2 battery temperature (battery); Tqcom1, Tqcom2 torque command value; UL, VL, WL line (three-phase); V1 predetermined voltage; VBA, VBB1, VBB2 voltage (battery output voltage); VLA, VLB, VH voltage; VHref voltage command value (VH); Win upper limit on electric power input; Win(M) upper limit on electric power input (to main power storage device); Win(S) upper limit on electric power input (to selected sub power storage device); Wout upper limit on electric power output; Wout(M) upper limit on electric power output (from main power storage device); and Wout(S) upper limit on electric power output (from selected sub power storage device).

BEST MODES FOR CARRYING OUT THE INVENTION

Hereinafter reference will be made to the drawings to more specifically describe the present invention in embodiments. In the following description, identical or equivalent components in the drawings are denoted by identical reference characters and will in principle not be described repeatedly.

FIG. 1 shows a main configuration of an electrically powered vehicle incorporating a power supply system according to an embodiment of the present invention.

With reference to FIG. 1, an electrically powered vehicle 1 includes power storage devices implemented as batteries BA, BB1, BB2, connection units 39A, 39B, converters 12A, 12B, smoothing capacitors C1, C2, CH, voltage sensors 10A, 10B1, 10B2, 13, 21A, 21B, temperature sensors 11A, 11B1, 11B2, current sensors 9A, 9B1, 9B2, an electric power feeding line PL2, inverters 14, 22, motor-generators MG1, MG2, a wheel 2, a power split device 3, an engine 4, and a control device 30.

The present embodiment provides a power supply system of the electrically powered vehicle including a main power storage device implemented as battery BA, electric power feeding line PL2 supplying electric power to inverter 14 driving motor-generator MG2, converter 12A provided between main power storage device (BA) and electric power feeding line PL2 to serve as a voltage converter converting voltage bidirectionally, batteries BB1, BB2 implementing a plurality of sub power storage devices provided in a manner parallel to each other, and converter 12B provided between the plurality of sub power storage devices (BB1, BB2) and electric power feeding line PL2 to serve as a voltage converter converting voltage bidirectionally. Voltage converter (12B) is connected selectively to one of the plurality of sub power storage devices (BB1, BB2) to convert voltage between the connected sub power storage device and electric power feeding line PL2 bidirectionally.

A sub power storage device (one of BB1 and BB2) and the main power storage device (BA) have their storable capacity set so that, for example, when they are concurrently used, they can output maximum power tolerated for an electric load (22 and MG2) connected to the electric power feeding line. This allows the vehicle without using the engine, i.e., traveling as an EV (Electric Vehicle), to travel with maximum power. If the sub power storage device's power storage state becomes lower, the sub power storage device can be exchanged to cause the vehicle to further travel, and if the sub power storage device's electric power has completely been consumed, then, in addition to the main power storage device, the engine can be used to allow the vehicle to travel with maximum power without using the sub power storage device.

Furthermore, such a configuration allows converter 12B to be shared between the plurality of sub power storage devices. This can eliminate the necessity of increasing the number of converters to be equal to that of power storage devices. For further increased EV travelable distance, an additional battery can be introduced in parallel with batteries BB1, BB2.

Preferably, this electrically powered vehicle has mounted thereon a main power storage device and sub power storage devices that are externally chargeable. For this purpose, electrically powered vehicle 1 further includes a battery charging device (a charging converter) 6 for connection to an external power supply 8 which is for example a commercial power supply of AC 100V. Battery charging device (6) converts alternate current to direct current and also adjusts voltage to supply electric power charged to a battery. Note that external charging may be achieved by the above-described configuration and in addition a system connecting a neutral point of a stator coil of motor-generator MG1, MG2 to alternate current power supply or a system causing converters 12A, 12B to together function as an AC/DC conversion device.

Smoothing capacitor C1 is connected between a power supply line PL1A and a ground line SL2. Voltage sensor 21A detects a voltage VLA across ends of smoothing capacitor C1 and outputs it to control device 30. Converter 12A can step up voltage across terminals of smoothing capacitor C1 and supply it to electric power feeding line PL2.

Smoothing capacitor C2 is connected between a power supply line PL1B and ground line SL2. Voltage sensor 21B detects a voltage VLB across ends of smoothing capacitor C2 and outputs it to control device 30. Converter 12B can step up voltage across terminals of smoothing capacitor C2 and supply it to electric power feeding line PL2.

Smoothing capacitor CH smoothes the voltage stepped up by converter 12A, 12B. Voltage sensor 13 senses a voltage VH across terminals of smoothing capacitor CH and outputs it to control device 30.

Alternatively, in an opposite direction, converters 12A, 12B can step down voltage VH across terminals smoothed by smoothing capacitor CH and supply it to power supply lines PL1A, PL1B.

Inverter 14 receives direct current voltage from converter 12B and/or 12A, converts it to three-phase alternate current voltage, and outputs it to motor-generator MG1. Inverter 22 receives direct current voltage from converter 12B and/or 12A, converts it to three-phase alternate current voltage, and outputs it to motor-generator MG2.

Power split device 3 is a mechanism coupled to engine 4 and motor-generators MG1, MG2 to distribute motive power therebetween. The power split device can for example be a planetary gear mechanism having three shafts of rotation of a sun gear, a planetary carrier, and a ring gear. In the planetary gear mechanism, when two of the three shafts of rotation have their rotation determined, that of the other one shaft of rotation is compulsively determined. These three shafts of rotation are connected to engine 4 and motor-generators MG1, MG2 at their respective shafts of rotation, respectively. Motor-generator MG2 has its shaft of rotation coupled to wheel 2 by a reduction gear, a differential gear or the like (not shown). Furthermore, power split device 3 may further have a speed reducer incorporated therein for the shaft of rotation of motor-generator MG2.

Connection unit 39A includes a system main relay SMR2 connected between the positive electrode of battery BA and power supply line PL1A, a system main relay SMR1 and a limiting resistor R connected in series and connected in parallel with system main relay SMR2, and a system main relay SMR3 connected between the negative electrode of battery BA (a ground line SL1) and a node N2.

System main relays SMR1 to SMR3 have their conduction/non-conduction states controlled (or are turned on/off) by relay control signals CONT1 to CONT3, respectively, issued from control device 30.

Voltage sensor 10A measures a voltage VA across terminals of battery BA. Furthermore, temperature sensor 11A measures a temperature TA of battery BA, and current sensor 9A measures a current IA input/output to/from battery BA. These sensors' measurements are output to control device 30. Based on these measurements, control device 30 monitors a state of battery BA represented by state of charge (SOC).

Connection unit 39B is provided between power supply line PL1B and ground line SL2, and batteries BB1, BB2. Connection unit 39B includes a relay SR1 connected between the positive electrode of battery BB1 and power supply line PL1B, a relay SR1G connected between the negative electrode of battery BB1 and ground line SL2, a relay SR2 connected between the positive electrode of battery BB2 and power supply line PL1B, and a relay SR2G connected between the negative electrode of battery BB2 and ground line SL2.

Relays SR1, SR2 have their conduction/non-conduction states controlled (or are turned on/off) by relay control signals CONT4, CONT5, respectively, issued from control device 30. Relays SR1G, SR2G have their conduction/non-conduction states controlled (or are turned on/off) by relay control signals CONT6, CONT7, respectively, issued from control device 30. Ground line SL2 extends through converters 12A, 12B toward inverters 14 and 22, as will be described later.

Voltage sensors 10B1 and 10B2 measure voltages VBB1 and VBB2 across terminals of batteries BB1 and BB2, respectively. Temperature sensors 11B1 and 11B2 measure temperatures TBB1 and TBB2 of batteries BB1 and BB2, respectively. Current sensors 9B1 and 9B2 measure currents IB1 and IB2 input/output to/from batteries BB1 and BB2, respectively. These sensors' measurements are output to control device 30. Based on these measurements, control device 30 monitors the states of batteries BB1, BB2 represented by state of charge (SOC).

Battery BA, BB1, BB2 can for example be a lead-acid battery, a nickel metal hydride battery, a lithium ion battery, or a similar secondary battery, an electric double layer capacitor or a similar capacitor of large capacity, or the like.

Inverter 14 is connected to electric power feeding line PL2 and ground line SL2. Inverter 14 receives a voltage stepped up from converter 12A and/or converter 12B, and drives motor-generator MG1 for example to start engine 4. Furthermore, inverter 14 returns to converters 12A and 12B the electric power generated by motor-generator MG1 by motive power transmitted from engine 4. At this time, converters 12A and 12B are controlled by control device 30 to operate as step-down converters.

Current sensor 24 detects a current that flows to motor-generator MG1 as a motor current value MCRT1, and outputs motor current value MCRT1 to control device 30.

Inverter 22 is connected to electric power feeding line PL2 and ground line SL2 in a manner parallel with inverter 14. Inverter 22 receives direct current voltage from converters 12A and 12B, converts it to three-phase alternate current voltage, and outputs it to motor-generator MG2 driving wheel 2. Furthermore, inverter 22 returns to converters 12A and 12B the electric power generated by motor-generator MG2 as the vehicle is regeneratively braked. At this time, converters 12A and 12B are controlled by control device 30 to operate as step-down converters.

Current sensor 25 detects a current that flows to motor-generator MG2 as a motor current value MCRT2, and outputs motor current value MCRT2 to control device 30.

Control device 30 is constituted of an electronic control unit (ECU) having a central processing unit (CPU) and a memory (not shown) incorporated therein, and in accordance with a map and a program stored in the memory, uses each sensor's measurement to perform operation processing. Note that control device 30 may have a portion configured to allow an electronic circuit or similar hardware to perform predetermined arithmetic and logical operations.

More specifically, control device 30 receives torque command values for motor-generators MG1, MG2, respectively, the motor-generators' respective speeds, the voltage VBA, VBB1, VBB2, VLA, VLB, VH values, motor current values MCRT1, MCRT2, and a start signal IGON. Then, control device 30 outputs a control signal PWUB instructing converter 12B to step up voltage, a control signal PWDB instructing converter 12B to step down voltage, and a shutdown signal prohibiting an operation.

Furthermore, control device 30 outputs a control signal PWMI1 instructing inverter 14 to convert direct current voltage output from converters 12A, 12B to alternate current voltage for driving motor-generator MG1, and a control signal PWMC1 instructing inverter 14 to convert alternate current voltage generated by motor-generator MG1 to direct current voltage and return it toward converters 12A, 12B for regeneration.

Similarly, control device 30 outputs a control signal PWMI2 instructing inverter 22 to convert direct current voltage to alternate current voltage for driving motor-generator MG2, and a control signal PWMC2 instructing inverter 22 to convert alternate current voltage generated by motor-generator MG2 to direct current voltage and return it toward converters 12A, 12B for regeneration.

Electrically powered vehicle 1 further includes an EV switch 40. EV switch 40 is operated by a user. EV switch 40 is for switching the travel mode of electrically powered vehicle 1 between an EV mode and an HV mode. The EV mode is a mode in which battery's electric power is positively used for driving motor-generator MG2, thereby causing motor-generator MG2 to generate power to drive the vehicle. In the EV mode, engine 4 is basically stopped. On the other hand, the HV mode is a travel mode when the EV mode is not selected (when the EV mode is canceled), and more specifically, a mode in which power to drive the vehicle is generated by motor-generator MG2 and engine 4.

EV switch 40 has an ON state and an OFF state. The ON state and the OFF state correspond to the HV mode and the EV mode, respectively. Control device 30 detects the state of EV switch 40, thereby setting the travel mode either in the HV mode or in the EV mode.

In the present embodiment, when a user operates EV switch 40 so that it has the ON state, the EV mode is canceled and the travel mode is set in the HV mode. EV switch 40 may, however, have an ON state and an OFF state that correspond to the EV mode and the HV mode, respectively.

Figure 2:
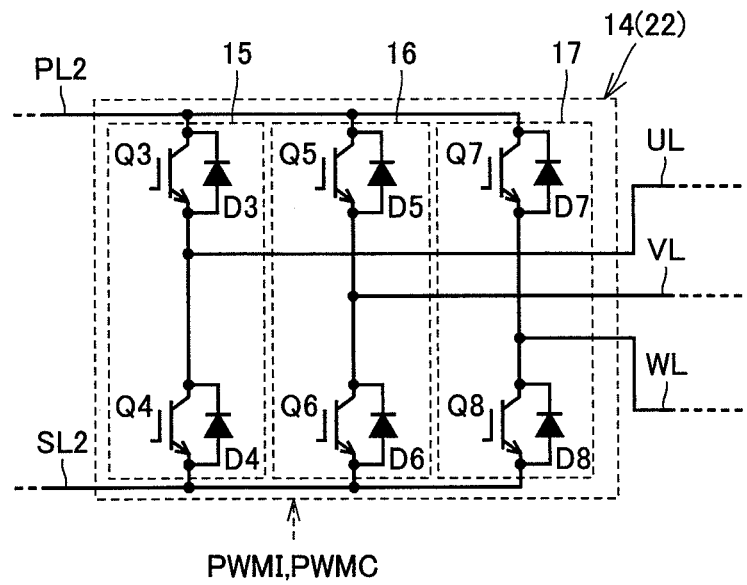
FIG. 2 is a circuit diagram showing in detail a configuration of inverters 14 and 22 shown in FIG. 1.

FIG. 2 is a circuit diagram showing in detail a configuration of inverters 14 and 22 shown in FIG. 1.

With reference to FIG. 2, inverter 14 includes a U-phase arm 15, a V-phase arm 16, and a W-phase arm 17. U-phase arm 15, V-phase arm 16, and W-phase arm 17 are connected between electric power feeding line PL2 and ground line SL2 in parallel.

U-phase arm 15 includes insulated gate bipolar transistor (IGBT) devices Q3, Q4 connected in series between electric power feeding line PL2 and ground line SL2, IGBT devices Q3, Q4, and their respective anti-parallel diodes D3, D4. Diode D3 has its cathode connected to IGBT device Q3 at the collector, and its anode to IGBT device Q3 at the emitter. Diode D4 has its cathode connected to IGBT device Q4 at the collector and its anode to IGBT device Q4 at the emitter.

V-phase arm 16 includes IGBT devices Q5, Q6 connected in series between electric power feeding line PL2 and ground line SL2, and their respective anti-parallel diodes D5, D6. IGBT devices Q5, Q6 and anti-parallel diodes D5, D6 are connected similarly as in U-phase arm 15.

W-phase arm 17 includes IGBT devices Q7, Q8 connected in series between electric power feeding line PL2 and ground line SL2, and their respective anti-parallel diodes D7, D8. IGBT devices Q7, Q8 and anti-parallel diodes D7, D8 are also connected similarly as in U-phase arm 15.

Note that in the present embodiment an IGBT device is indicated as a representative example of a power semiconductor switching element controllable to be turned on/off. In other words, it is also replaceable with a bipolar transistor, a field effect transistor, or a similar power semiconductor switching element.

Each phase arm has an intermediate point connected to motor-generator MG1 at each phase coil at each phase end. In other words, motor-generator MG1 is a three-phase permanent magnet synchronous motor and the three U-, V-, W-phase coils each have one end connected together to an intermediate point. The U-phase coil has the other end connected to a line UL drawn from a connection node of IGBT devices Q3, Q4. The V-phase coil has the other end connected to a line VL drawn from a connection node of IGBT devices Q5, Q6. The W-phase coil has the other end connected to a line WL drawn from a connection node of IGBT devices Q7, Q8.

Inverter 22 shown in FIG. 1 is also different in that it is connected to motor-generator MG2, however, its internal circuit configuration is similar to inverter 14. Accordingly, it will not be described repeatedly in detail. Furthermore, FIG. 2 shows an inverter receiving control signals PWMI, PWMC. This is to avoid complexity. Specifically, as shown in FIG. 1, different control signals PWMI1, PWMC1 and control signals PWMI2, PWMC2 are input to inverters 14, 22, respectively.

Figure 3:
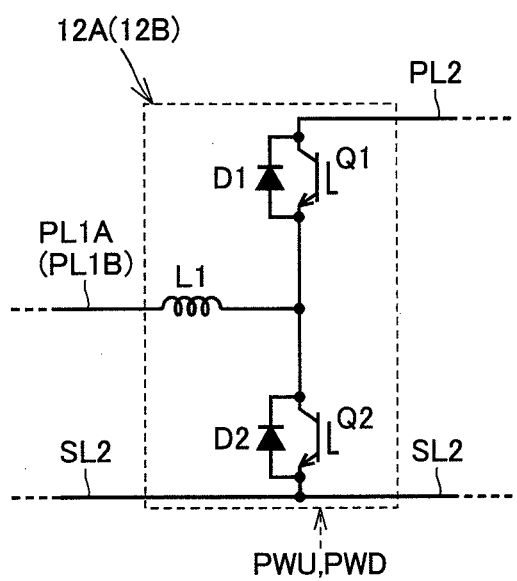
FIG. 3 is a circuit diagram showing in detail a configuration of converters 12A and 12B shown in FIG. 1.

FIG. 3 is a circuit diagram showing in detail a configuration of converters 12A and 12B shown in FIG. 1.

With reference to FIG. 3, converter 12A includes a reactor L1 having one end connected to power supply line PL1A, IGBT devices Q1, Q2 connected in series between electric power feeding line PL2 and ground line SL2, and their respective anti-parallel diodes D1, D2.

Reactor L1 has the other end connected to IGBT device Q1 at the emitter and to IGBT device Q2 at the collector. Diode D1 has its cathode connected to IGBT device Q1 at the collector and its anode to IGBT device Q1 at the emitter. Diode D2 has its cathode connected to IGBT device Q2 at the collector and its anode to IGBT device Q2 at the emitter.

Converter 12B shown in FIG. 1 is again different from converter 12A in that the former is not connected to power supply line PL1A and instead to power supply line PL1B, however, its internal circuit configuration is similar to converter 12A. Accordingly, it will not be described repeatedly in detail. Furthermore, FIG. 3 shows a converter receiving control signals PWU, PWD, however, this is to avoid complexity. As shown in FIG. 1, different control signals PWUA, PWDA and control signals PWUB, PWDB are input to inverters 14, 22, respectively.

In the power supply system of electrically powered vehicle 1, battery BA (the main power storage device) and a sub power storage device selected from batteries BB1, BB2 (hereinafter also referred to as a "selected sub power storage device BB") and motor-generators MG1, MG2 supply and receive electric power therebetween.

Control device 30 receives values detected by voltage sensor 10A, temperature sensor 11A and current sensor 9A, and in accordance therewith sets an SOC(BA) indicating the main power storage device's residual capacity, an upper limit on electric power input Win(M) indicating an upper limit value of electric power charged thereto, and an upper limit on electric power output Wout(M) indicating an upper limit value of electric power discharged therefrom.

Furthermore, control device 30 receives values detected by voltage sensors 10B1, 10B2, temperature sensors 11B1, 11B2 and current sensors 9B1, 9B2 and in accordance therewith sets an SOC(BB) of selected sub power storage device BB and upper limits on electric power input and output Win (S), Wout(S) thereto and therefrom, respectively.

Generally, an SOC is indicated by a ratio (%) of each battery's current charged amount to its fully charged state. Furthermore, Win, Wout are indicated as such an upper limit value of electric power that, when that electric power is discharged for a predetermined period of time (e.g., for approximately 10 seconds), the battery of interest (BA, BB1, BB2) is not overcharged/overdischarged.

Figure 4:
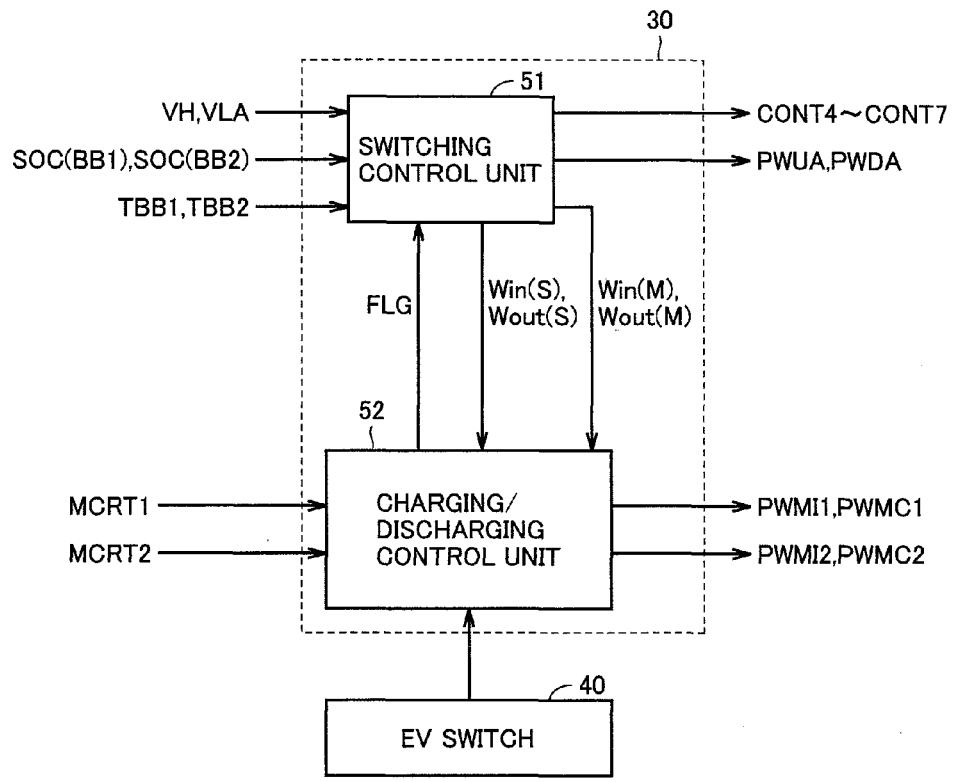
FIG. 4 is a functional block diagram of a control device 30.

FIG. 4 is a functional block diagram of control device 30. FIG. 4 shows functional blocks, which are implemented by control device 30 executing a previously stored, predetermined program and/or by processing of an operation by electronic circuitry (hardware) in control device 30.

With reference to FIG. 4, control device 30 includes a switching control unit 51 and a charging/discharging control unit 52. Switching control unit 51 receives each value of voltages VH, VLA, SOC(BB1), SOC(BB2) and temperatures TBB1, TBB2 to output signals CONT4 to CONT7 and signal PWUA (or PWDA) for switching a selected sub power storage device. Note that control of switching of a selected sub power storage device will be described later in detail.

Switching control unit 51 receives a flag FLG (switching permission flag) indicating permission for switching of a selected sub power storage device. Flag FLG enters an ON state when switching of a selected sub power storage device is permitted, and flag FLG enters an OFF state when switching of a selected sub power storage device is prohibited. Switching control unit 51 carries out the above-described switching control when flag FLG is in the ON state. Switching control unit 51 further outputs Win(M), Wout(M), Win(S), and Wout (S). In other words, flag FLG in the OFF state corresponds to an instruction for prohibiting switching control by switching control unit 51.

Charging/discharging control unit 52 controls charging and discharging to and from the main power storage device and the sub power storage devices when electrically powered vehicle 1 is traveling. Specifically, charging/discharging control unit 52 controls power distribution between engine 4 and motor-generators MG1, MG2. For this purpose, charging/discharging control unit 52 receives motor current values MCRT1, MVCRT2, a request amount of regenerative braking, upper limits on electric power input Win(M), Win(S), and upper limits on electric power output Wout(M), Wout(S) to control charging and discharging to and from main power storage device BA and sub power storage devices BB1, BB2 in accordance with upper limits on electric power input Win (M), Win(S) or upper limits on electric power output Wout (M), Wout(S).

Charging/discharging control unit 52 sets, in response to operation of EV switch 40 by a user, the travel mode of the electrically powered vehicle either in the EV mode or in the HV mode. Charging/discharging control unit 52 sets flag FLG in the ON state when the travel mode is set in the EV mode. In this case, switching control unit 51 is permitted to control switching of a sub power storage device. On the other hand, when the travel mode is set in the HV mode, charging/discharging control unit 52 sets flag FLG in the OFF state. In this case, switching control unit 51 is prohibited from controlling switching of a sub power storage device.

It is noted that the fact that flag FLG enters the OFF state corresponds to the fact that charging/discharging control unit 52 has generated a switching prohibit instruction. In addition, the fact that flag FLG enters the ON state corresponds to the fact that charging/discharging control unit 52 has stopped generating the switching prohibit instruction.

Figure 5:
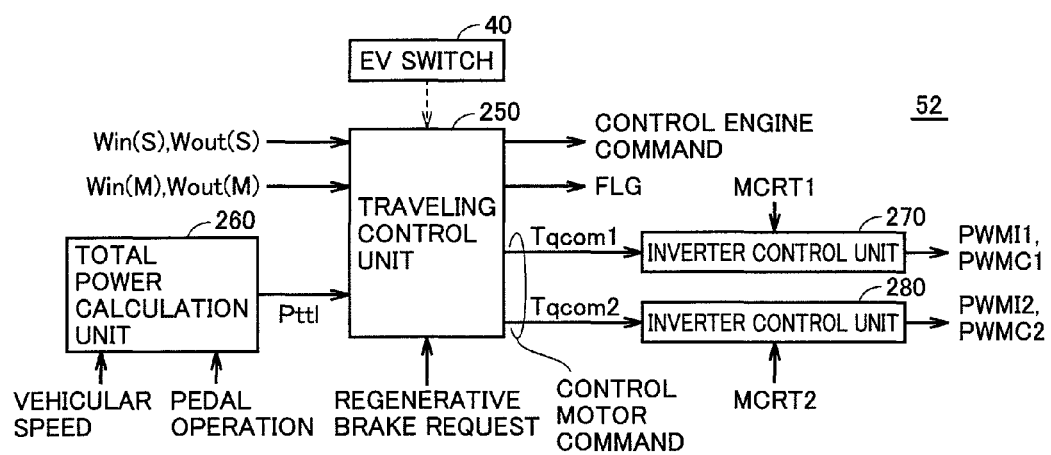
FIG. 5 is a functional block diagram for illustrating a charging/discharging control unit 52.

FIG. 5 is a functional block diagram for illustrating charging/discharging control unit 52. With reference to FIG. 5, charging/discharging control unit 52 includes a traveling control unit 250, a total power calculation unit 260 and inverter control units 270, 280.

Total power calculation unit 260 calculates total power Pttl required for the entirety of electrically powered vehicle 1 from a vehicular speed and an operation of a pedal (an accelerator pedal). Note that total required power Pttl may also include power required (i.e., the engine's output), depending on a vehicle's condition, for generating electric power by motor-generator MG1 to charge a battery.

Traveling control unit 250 receives upper limits on electric power input/output Win(M), Wout(M) to/from main power storage device BA, upper limits on electric power input/output Win(S), Wout(S) to/from selected sub power storage device BB, total required power Pttl from total power calculation unit 260, and a regenerative brake request made when the brake pedal is operated. Traveling control unit 250 generates a control motor command, or torque command values Tqcom1 and Tqcom2, to allow motor-generators MG1, MG2 to in total receive/output electric power within a charging limit (Win(M)+Win(S)) and a discharging limit (Wout(M)+Wout(S)) in total for main power storage device BA and selected sub power storage device BB. Furthermore, to ensure total required power Pttl, it is assigned between power provided by motor-generator MG2 to drive the vehicle and that provided by engine 4 to do so. In particular, externally charged battery's electric power is maximally utilized to restrict engine 4 from operation or the power provided by engine 4 to drive the vehicle is set to correspond to a range allowing engine 4 to be highly efficiently operable to control the vehicle to travel to achieve high fuel-efficiency.

Inverter control unit 270 receives torque command value Tqcom1 and motor current value MCRT1 of motor-generator MG1 and therefrom generates control signals PWMI1, PWMC1 for inverter 14. Similarly, inverter control unit 280 receives torque command value Tqcom2 and motor current value MCRT2 of motor-generator MG2 and therefrom generates control signals PWMI2, PWMC2 for inverter 22. Furthermore, traveling control unit 250 generates a control engine command in response to a value requested of power provided by the engine to drive the vehicle, as set. Furthermore, a control device (an engine ECU) (not shown) controls the operation of engine 4 in accordance with the control engine command.

Furthermore, traveling control unit 250 turns flag FLG on or off in response to operation of EV switch 40 by a user.

Figure 6:
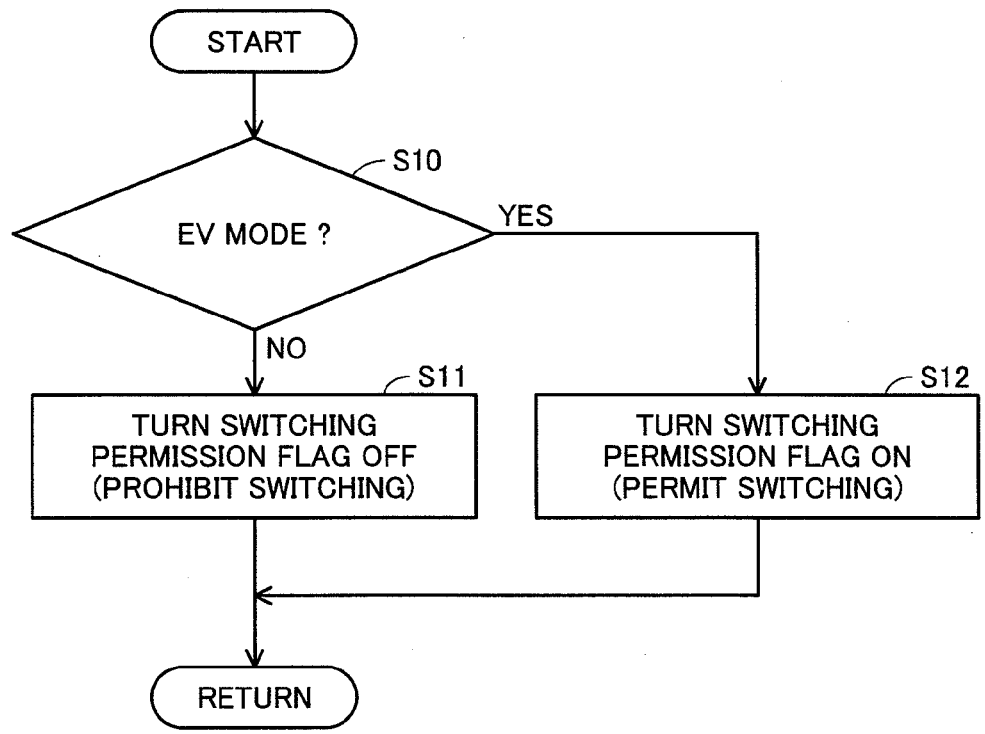
FIG. 6 is a flowchart for illustrating a flag FLG setting process by a traveling control unit 250.

FIG. 6 is a flowchart for illustrating a flag FLG setting process by traveling control unit 250. Control device 30 (traveling control unit 250) can execute a previously stored, predetermined program periodically, as predetermined, to repeatedly perform a control processing procedure in accordance with the flowchart shown in FIG. 6, periodically as predetermined.

With reference to FIG. 6, traveling control unit 250 determines in step S10 whether the travel mode is the EV mode or not. Traveling control unit 250 determines, based on a result of operation of EV switch 40 by a user, whether the travel mode is the EV mode or not. Traveling control unit 250 may also determine that the travel mode is the EV mode, when a process for generating engine control command is currently performed.

If it is determined that the travel mode is not the EV mode (NO in step S10), then in step S11, traveling control unit 250 turns flag FLG (switching permission flag) off. That is, if the travel mode is the HV mode, flag FLG is set OFF, and therefore, switching of a selected sub power storage device is prohibited. On the other hand, if it is determined that the travel mode is the EV mode (NO in step S10), then in step S12, traveling control unit 250 turns flag FLG on. That is, if the travel mode is the EV mode, flag FLG is set ON, and therefore, switching of a selected sub power storage device is permitted.

Referring back to FIG. 5, when control device 30 (charging/discharging control unit 52) actively uses battery's electric power to travel (i.e., in the EV mode) and total required power Pttl is equal to or smaller than the batteries' total upper limit on electric power output Wout(M)+Wout(S), engine 4 is not operated but motor-generator MG2 alone provides power to drive the vehicle to travel. When total required power Pttl exceeds Wout(M)+Wout(S), engine 4 is started.

In contrast, when the EV mode is not selected, i.e., in the HV mode, control device 30 (charging/discharging control unit 52) controls distribution of driving power between engine 4 and motor-generator MG2 to keep the batteries' SOC constant. In other words, traveling control under which travel with engine 4 is more actuatable than in the EV mode is carried out. Here, "batteries' SOC" refers to the SOC (remaining capacity) value of the main power storage device and sub power storage devices as a whole.

Figure 7:
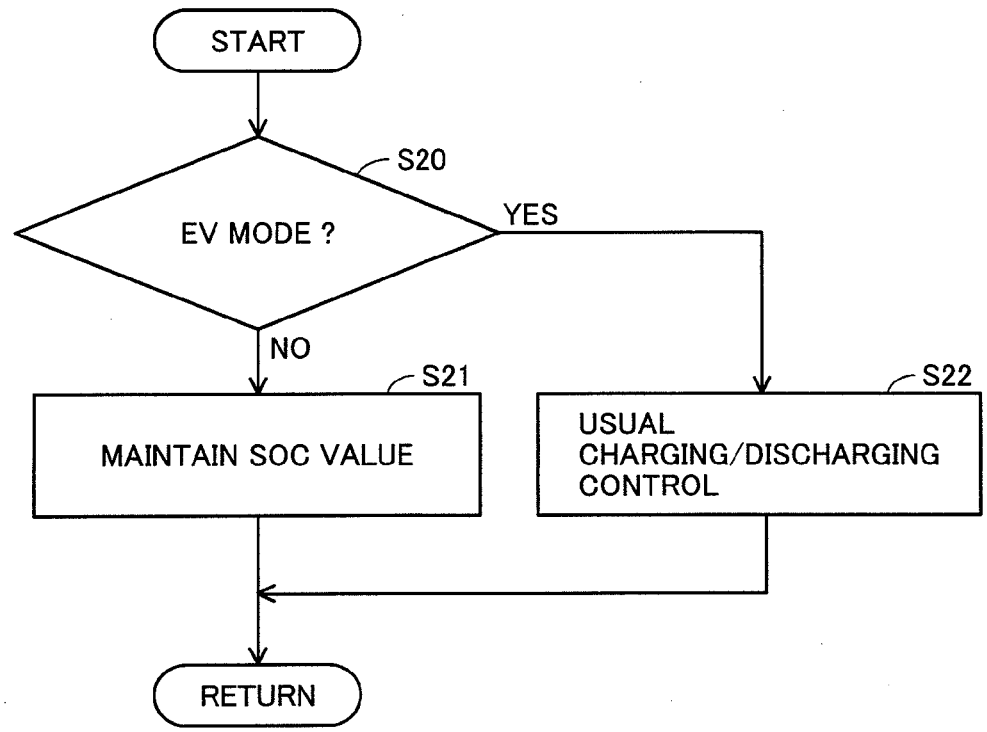
FIG. 7 is a flowchart for illustrating a charging/discharging control process by charging/discharging control unit 52.

FIG. 7 is a flowchart for illustrating a charging/discharging control process by charging/discharging control unit 52. Control device 30 (charging/discharging control unit 52) can execute a previously stored, predetermined program periodically, as predetermined, to repeatedly perform a control processing procedure in accordance with the flowchart shown in FIG. 7, periodically as predetermined. With reference to FIG. 7, traveling control unit 250 determines in step S20 whether the travel mode is the EV mode or not. Note that as a method for determining the travel mode, the method for determining in step S10 (FIG. 6) can be employed. If it is determined that the travel mode is not the EV mode (NO in step S20), then in step S21, traveling control unit 250 controls charging and discharging to and from the main power storage device and a selected sub power storage device such that the batteries' SOC is kept constant. In other words, in the HV mode, charging/discharging control unit 52 controls inverters 14, 22 and engine 4 in a manner maintaining the batteries' SOC at a target value.

For example, charging/discharging control unit 52 controls, based on change in the batteries' SOC, the amount of electricity generated by motor-generator MG2 in braking of the vehicle, thereby controlling the amount of charge to the main power storage device and a selected sub power storage device. Alternatively, charging/discharging control unit 52 controls, based on change in the batteries' SOC, distribution of power to drive the vehicle between engine 4 and motor-generator MG2, thereby controlling the amount of discharge from the main power storage device and a selected sub power storage device.

On the other hand, if it is determined that the travel mode is the EV mode (YES in step S20), then control for maintaining the batteries' SOC at a target value will not be carried out. In this case, in step S22, charging/discharging control unit 52 carries out a usual charging/discharging control. In other words, charging/discharging control unit 52 controls inverters 14, 22 based on total required power Pttl, thereby controls charging and discharging to and from the main power storage device and a selected sub power storage device.

In the EV mode, charging and discharging are controlled to preferentially use the electric power of selected sub power storage device BB rather than that of main power storage device BA. As such, when the vehicle is traveling and currently used and selected sub power storage device BB is decreased in SOC, selected sub power storage device BB needs to be switched. For example, if battery BB1 is set as selected sub power storage device BB in starting the vehicle, necessity will arise to subsequently disconnect battery BB1 from converter 12B and connect battery BB2 as newly selected sub power storage device BB to converter 12B, i.e., to perform a connection switching process.

Here, battery BB2 newly set as selected sub power storage device BB is generally higher in output voltage than battery BB1 that has been used so far. Consequently, connection of a new high-voltage battery may create an unintended short-circuit path, which may give rise to a problem in protection of equipment or the like. Therefore, in the process for switching connection of the sub power storage device, sufficient attention should be paid for preventing creation of a short-circuit path. In addition, during a period for the connection switching process above, as electric power supply and electric power collection by selected sub power storage device BB cannot be carried out, charging and discharging should be restricted so as not to cause overcharge and overdischarge in the power supply system as a whole during that period.

The process for switching connection of the sub power storage device with attention being paid to such disadvantages will be described hereinafter. Note that the "process for switching connection" corresponds to "switching control" described above.

Figure 8:
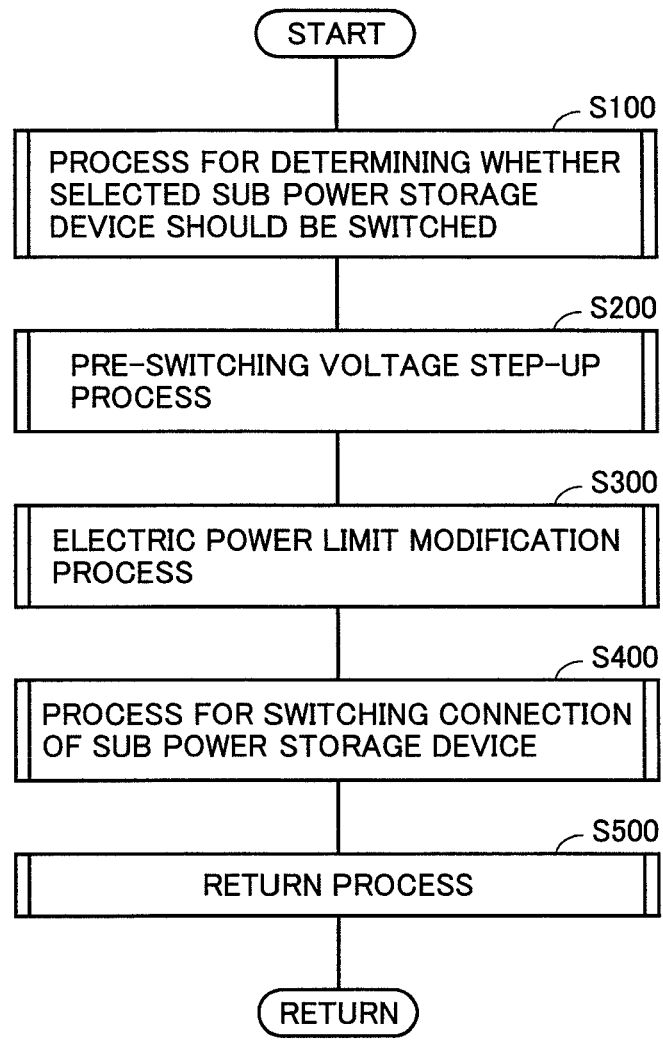
FIG. 8 is a flowchart of a general procedure of a process for switching a selected sub power storage device in the power supply system of the electrically powered vehicle according to an embodiment of the present invention.

FIG. 8 is a flowchart of a general procedure of the process for switching a selected sub power storage device in the power supply system of the electrically powered vehicle according to the embodiment of the present invention. Furthermore, FIGS. 9 to 12 are flowcharts for specifically illustrating steps S100, S200, S300, S400, and S500 in FIG. 7.

Control device 30 (switching control unit 51) can execute a previously stored, predetermined program periodically, as predetermined, to repeatedly perform a control processing procedure in accordance with the flowcharts shown in FIGS. 7 to 12, periodically as predetermined. The process for switching connection (switching control) of the sub power storage device in the power supply system of the electrically powered vehicle according to the embodiment of the present invention can thus be implemented.

With reference to FIG. 7, in step S100, switching control unit 51 performs a process for determining switching of a selected sub power storage device. If switching control unit 51 determines that it is necessary to switch the selected sub power storage device, the following steps S200 to S500 are performed. If switching control unit 51 determines in step S100 that it is not necessary to switch the selected sub power storage device, steps S200 to S500 are substantially not performed.

In step S200, switching control unit 51 performs a pre-switching voltage step-up process, and in step S300, performs an electric power limit modification process so that a request is not generated to the power supply system to excessively charge/discharge while connection of the sub power storage device is being switched. In step S400, control device 30 performs the connection switching process for actually switching connection between selected sub power storage device BB and converter 12B, and after completion of this process, in step S500, control device 30 performs a return process to start electric power supply by newly selected sub power storage device BB.

Figure 9:
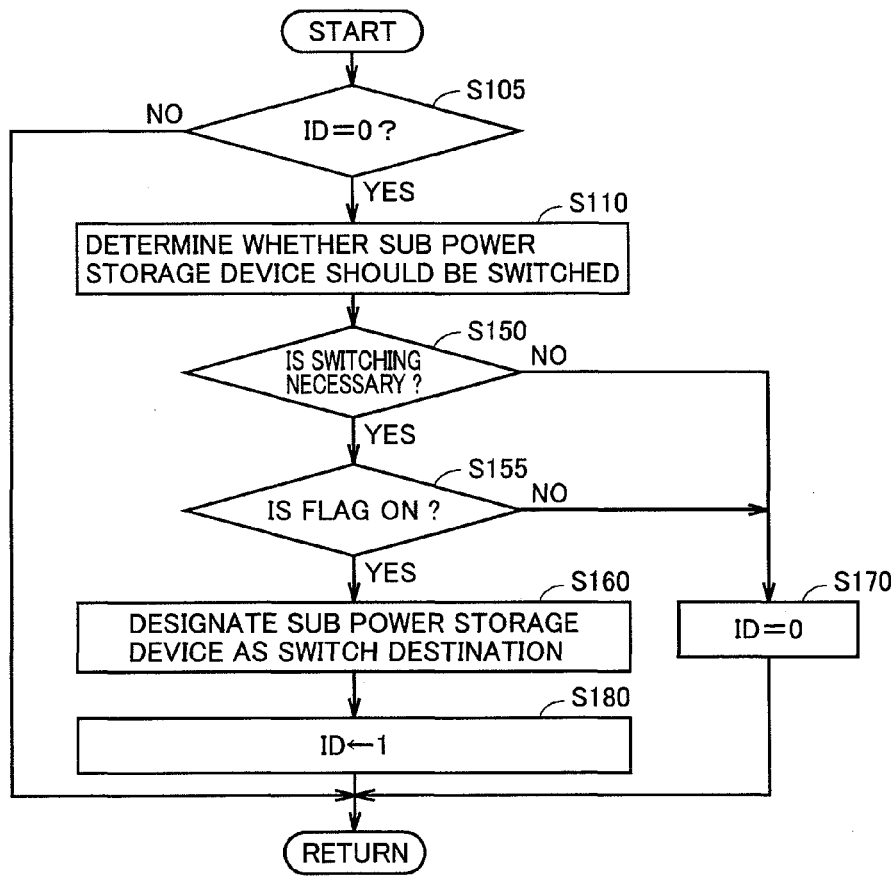
FIG. 9 is a flowchart for illustrating in detail the process in FIG. 8 performed to determine whether the selected sub power storage device should be switched or not (S100).

FIG. 9 is a flowchart for illustrating in detail the process in FIG. 8 performed to determine whether the selected sub power storage device should be switched or not (S100).

As will be described hereinafter, a variable ID is introduced to indicate the connection switching process's status. Variable ID is set to any of −1 and 0 to 4. ID=0 indicates a status in which no request for switching a sub power storage device is generated. In other words, when ID=0, currently selected sub power storage device BB supplies electric power, while whether selected sub power storage device BB should be switched or not is determined periodically as predetermined. Meanwhile, when there is no sub power storage device that can newly be used due to failure of equipment or consumption of electric power in the battery, it is assumed that ID=−1 is set.

With reference to FIG. 9, in step S105, switching control unit 51 determines whether ID=0 or not. If ID=0 (YES in S105), in step S110, switching control unit 51 makes determination as to whether the selected sub power storage device should be switched or not. Determination in step S110 is basically made based on a current SOC of selected sub power storage device BB. Namely, when the SOC of the sub power storage device in use is lower than a predetermined criterion value, determination that the selected sub power storage device should be switched is made.

In step S150, switching control unit 51 checks a result of determination in step S110 as to whether switching should be made or not. When it is determined that switching should be made (YES in step S150), switching control unit 51 determines in step S155 whether flag FLG (switching permission flag) is ON or not. If flag FLG is ON (YES in step S155), then switching control unit 51 designates in step S160, selected sub power storage device BB to newly be used. As shown in FIG. 1, in an example where two batteries BB1 and BB2 are mounted as the sub power storage devices, newly selected sub power storage device BB is automatically determined without the need to perform the processing in step S160. In the configuration in FIG. 1, however, if three or more selected sub power storage devices BB1 to BBn (n is an integer not smaller than 3) are mounted, a new sub power storage device to be used next is designated based on an SOC or the like of each of the sub power storage devices that are not currently used. Then, switching control unit 51 sets ID=1 in order to proceed with the connection switching process. Namely, ID=1 indicates a status that a request for switching selected sub power storage device BB is generated and the switching process is started.

On the other hand, when it is determined in step S110 that switching of the selected sub power storage device is not necessary (NO in S150), switching control unit 51 maintains ID=0 in step S170. In addition, if flag FLG is OFF (NO in step S155), then switching control unit 51 also maintains ID=0 in step S170. Meanwhile, when the switching process has been started as relation of ID≧1 is once satisfied or when ID=−1 is set because there is no sub power storage device that can newly be used, processing in steps S110 to S180 is skipped.

Figure 10:
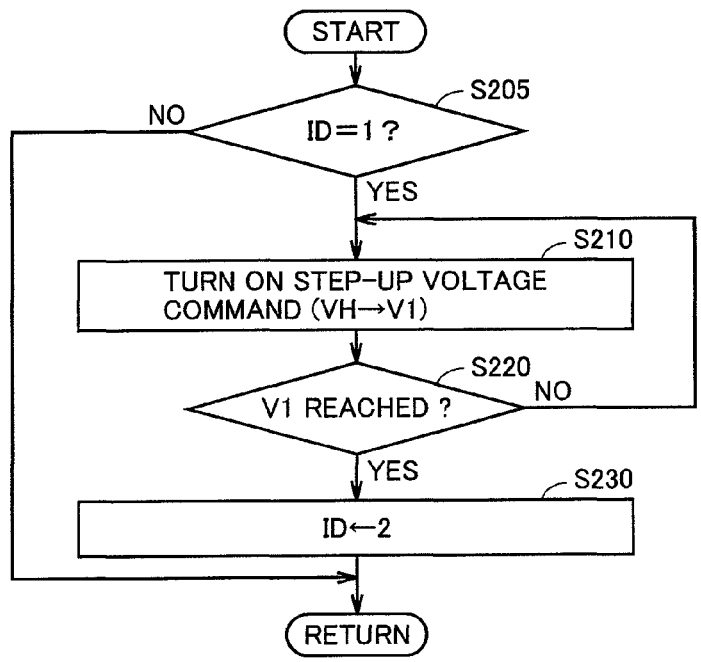
FIG. 10 is a flowchart for illustrating in detail a pre-switching voltage step-up process (S200) shown in FIG. 8.

FIG. 10 is a flowchart for illustrating in detail the pre-switching voltage step-up process (S200) shown in FIG. 8.

With reference to FIG. 10, in the pre-switching voltage step-up process, in step S205, switching control unit 51 confirms whether ID=1 or not. If ID=1, a request for switching selected sub power storage device BB is issued and the switching process is started (YES in S205), switching control unit 51 generates in step S210, a command to converter 12A to step up voltage VH on electric power feeding line PL2 to a predetermined voltage V1. In response to the step-up voltage command, a voltage command value VHref for electric power feeding line PL2 is set to be equal to V1, and in order to implement this voltage command value, control signal PWUA for converter 12A is generated.

Note that predetermined voltage V1 is set to be higher than any higher one of respective output voltages of main power storage device BA and selected sub power storage device BB that is newly connected (for example, BB2). For example, predetermined voltage V1 set at an upper limit control voltage VHmax that can be stepped up by converter 12A can ensure that voltage VH when a step-up voltage command is issued is higher than both of the output voltages of main power storage device BA and selected sub power storage device BB after switching. Alternatively, in view of reducing a loss caused at converter 12A, predetermined voltage V1 may be determined, as occasion demands, to have a margin, depending on voltages output from main power storage device BA and selected sub power storage device BB after switching at that time.

If a step-up voltage command is generated in step S210, in step S220, switching control unit 51 determines based on a value detected by voltage sensor 13 whether voltage VH has reached predetermined voltage V1 or not. Determination as YES is made in step S220, for example, when VH≧V1 continues for a predetermined period of time.

Once voltage VH has reached predetermined voltage V1 (YES in S220), switching control unit 51 furthers the ID from 1 to 2. Until voltage VH reaches V1 (NO in S220), ID=1 is held. In other words, ID=2 indicates a status in which the pre-switching voltage step-up process ends and the switching process can be furthered. If ID≠1 (NO in S205), processing in subsequent steps S210 to S230 is skipped.

Figure 11:
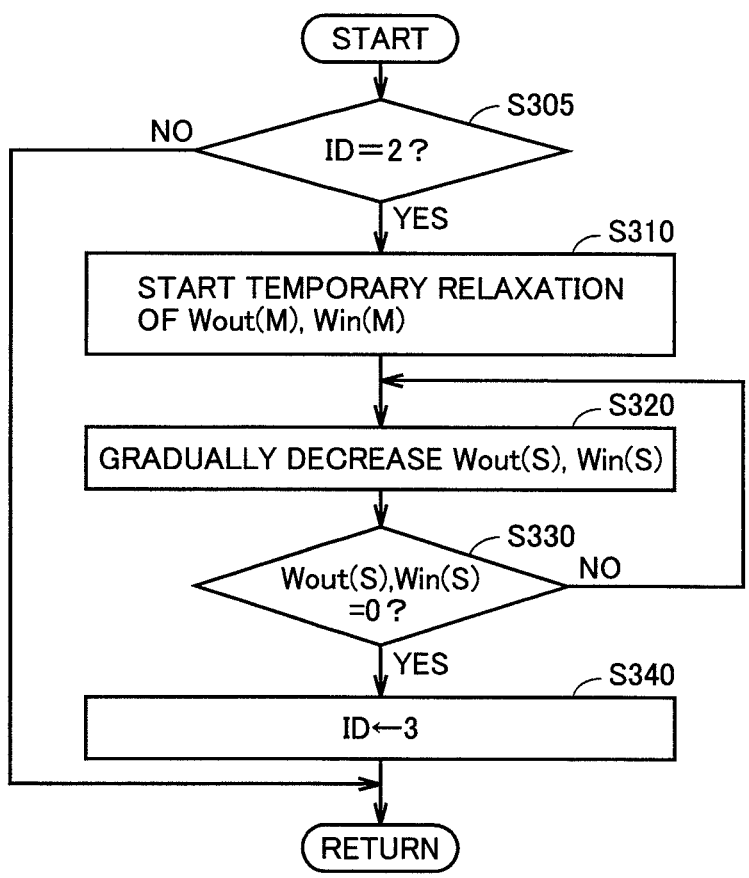
FIG. 11 is a flowchart for illustrating in detail an electric power limit modification process (S300) shown in FIG. 8.

Thus, when the pre-switching voltage step-up process (step S200) ends, switching control unit 51 performs the electric power limit modification process as shown in FIG. 11.

FIG. 11 is a flowchart for illustrating in detail the electric power limit modification process (S300) shown in FIG. 8.

With reference to FIG. 11, in the electric power limit modification process, initially in step S305, switching control unit 51 determines whether ID=2 or not. If ID=2 is not satisfied (NO in S305), processing in subsequent steps S310 to S340 is skipped.

If ID=2 (YES in S305), in step S310, switching control unit 51 starts temporary relaxation of charging and discharging restriction on main power storage device BA. Specifically, absolute values of upper limits on electric power input/output Win(M), Wout(M) to/from main power storage device BA are temporarily increased.

In addition, in step S320, switching control unit 51 gradually decreases absolute values of upper limits on electric power input/output Win(S), Wout(S) to/from selected sub power storage device BB. For example, Wout(S), Win(S) are decreased gradually toward 0 at a predetermined fixed rate.

In step S330, switching control unit 51 determines whether Wout(S), Win(S) have reached 0 or not. Until Wout(S)=Win(S)=0, step S320 is repeated to continuously decrease Wout(S) and Win(S).

Once Wout(S) and Win(S) have reached 0 (YES in S330), switching control unit 51 furthers the ID from 2 to 3 in step S340. In other words, ID=3 indicates a status in which the pre-switching voltage step-up process and the electric power limit modification process have ended and switching of connection between sub power storage devices BB1, BB2 and converter 12B can be started.

When the electric power limit modification process shown in FIG. 11 ends, switching control unit 51 performs the process for switching connection of the sub power storage device in step S400.

Figure 12:
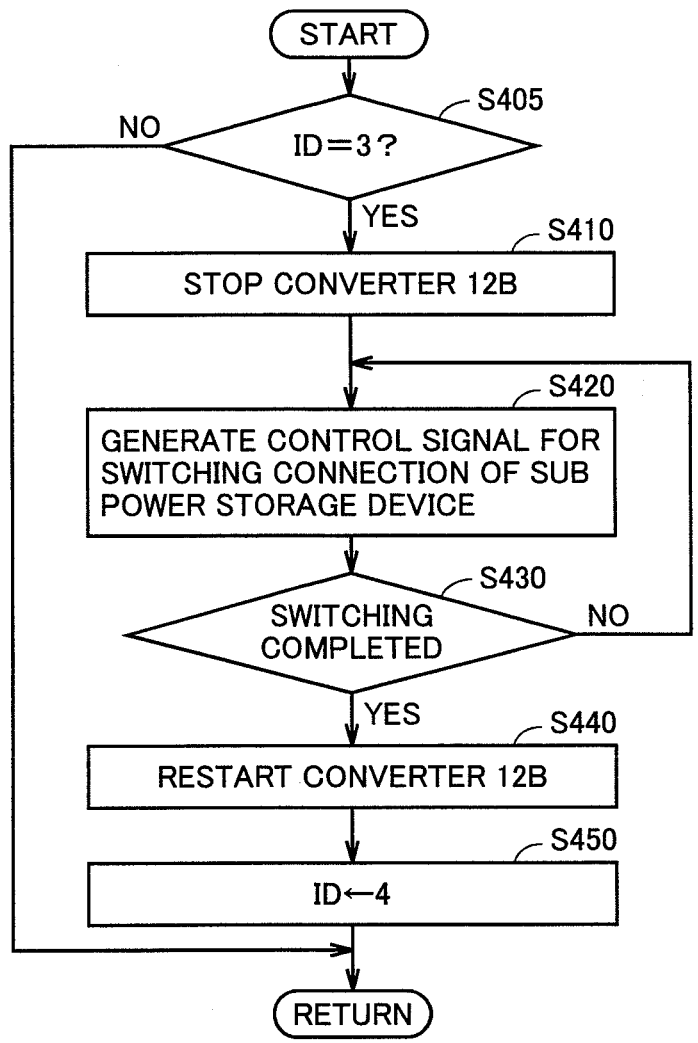
FIG. 12 is a flowchart for illustrating in detail a process for switching connection of the sub power storage device (S400), as shown in FIG. 8.

FIG. 12 is a flowchart for illustrating in detail the process for switching connection of the sub power storage device (S400), as shown in FIG. 8.

With reference to FIG. 12, in the process for switching connection of the sub power storage device, initially in step S405, switching control unit 51 determines whether ID=3 or not. If ID≠3 (NO in S405), processing in subsequent steps S410 to S450 is skipped.

If ID=3 (YES in S405), in step S410, switching control unit 51 stops converter 12B to prepare for switching connection of the sub power storage device. More specifically, in converter 12B, IGBT devices Q1, Q2 are forced to be turned off in response to a shutdown command, and in that condition, switching control unit 51 generates in step S420 a relay control signal for actually switching connection of the sub power storage device. For example, in order to disconnect battery BB1 from converter 12B and connect battery BB2 with converter 12B, relay control signals CONT4, CONT6 are generated to turn off relays SR1, SR1G, and relay control signals CONT5, CONT7 are generated to turn on relays SR2, SR2G.

Furthermore, in step S430, switching control unit 51 determines whether or not relay connection switching as instructed in step S420 has been completed. When the connection switching has been completed (YES in S430), switching control unit 51 restarts converter 12B to start a switching operation in step S440, and furthers the ID from 3 to 4 in step S450.

In other words, ID=4 indicates a state in which switching of connection between the sub power storage devices and converter 12B by means of the relays has been completed.

When the connection switching process in step S400 ends, switching control unit 51 performs the return process in step S500.

Figure 13:
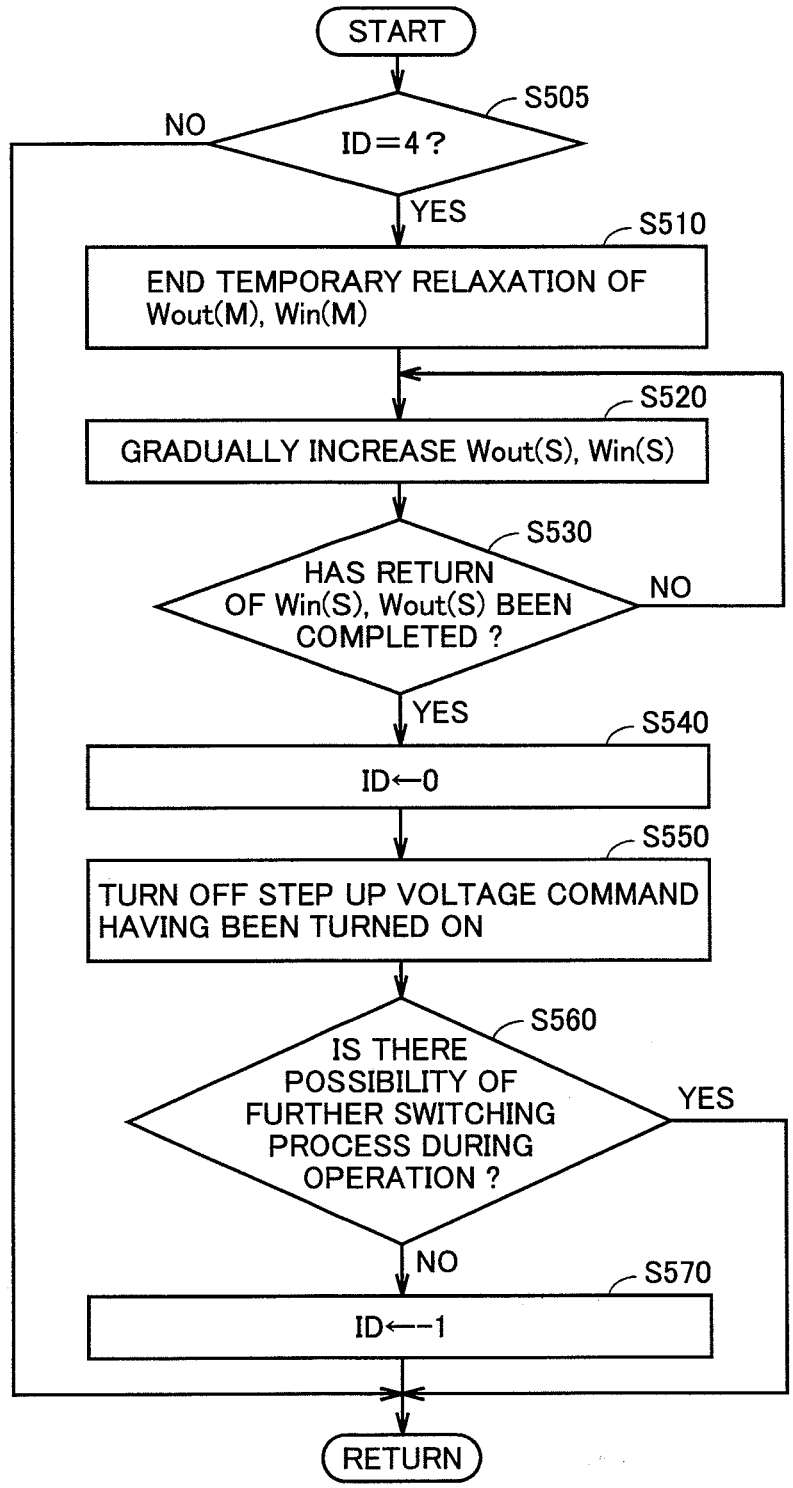
FIG. 13 is a flowchart for illustrating in detail a return process (S500) shown in FIG. 8.

FIG. 13 is a flowchart for illustrating in detail the return process (S500) shown in FIG. 8.

With reference to FIG. 13, in the return process, switching control unit 51 initially determines whether or not ID=4 in step S505. If ID≠4 (NO in S505), processes in subsequent steps S510 to S570 are skipped.

If ID=4 (YES in S505), in step S510, switching control unit 51 ends the temporary relaxation of charging and discharging limits for main power storage device BA started in step S310 (FIG. 11). Thereby, Wout(M) and Win(M) basically return to values before the start of the switching process for selected power storage device BB.

Further, switching control unit 51 gradually increases upper limits on electric power input/output Win(S), Wout(S) to/from selected sub power storage device BB decreased to 0 in the electric power limit modification process (step S300), to values of Win, Wout to/from a newly selected sub power storage device (for example, battery BB2).

Then, in step S530, switching control unit 51 confirms whether or not upper limits on electric power input/output Win(S), Wout(S) have returned to the values of Win, Wout to/from newly selected sub power storage device BB. During a period until return is completed (NO in S530), step S520 is repeatedly performed to gradually increase upper limits on electric power input/output Win(S), Wout(S) at a fixed rate.

When return of upper limits on electric power input/output Win(S), Wout(S) is completed (YES in S530), switching control unit 51 returns the ID back to 0 in step S540. Thereby, a state in which normal supply and recovery of electric power by main power storage device BA and newly selected sub power storage device BB can be performed is reproduced in the power supply system.

Further, the process proceeds to step S550 and switching control unit 51 turns off the step-up voltage command generated in step S210 (FIG. 10). Thus, the voltage command value for electric power feeding line PL2 is also set to an ordinary value set in accordance with the states of motor generators MG1, MG2.

After completion of a series of switching processes, switching control unit 51 may further determine in step S560 whether or not there is a possibility that further switching of the selected sub power storage device is performed during traveling of the vehicle. If there is no possibility of further switching, switching control unit 51 sets ID=−1 in step S570. If ID=−1 is set, steps S100 to S500 in FIG. 8 are substantially not performed, and thus the switching process for the selected sub power storage device is not started until the vehicle stops operation.

On the other hand, if there is a possibility of further switching, switching control unit 51 skips step S570 and maintains ID=0. As a result, the switching determination process in step S100 is performed periodically as predetermined, and thereby the switching process for the selected sub power storage device is restarted as necessary.

Note that, in the exemplary configuration of FIG. 1 in which only two sub power storage devices are mounted, it is possible to omit the process in step S560, that is, always set ID=−1 once the switching process for the selected sub power storage device is completed, thereby limiting the number of times the switching process for the selected sub power storage device is performed during driving of the vehicle, to only one.

Alternatively, in a power supply system equipped with three or more sub power storage devices or a power supply system having a configuration such that a sub power storage device not in use can be charged during driving of a vehicle, the power supply system can be configured such that a second or later switching process for a selected sub power storage device can be performed by maintaining ID=0 depending on a situation.

Figure 14:
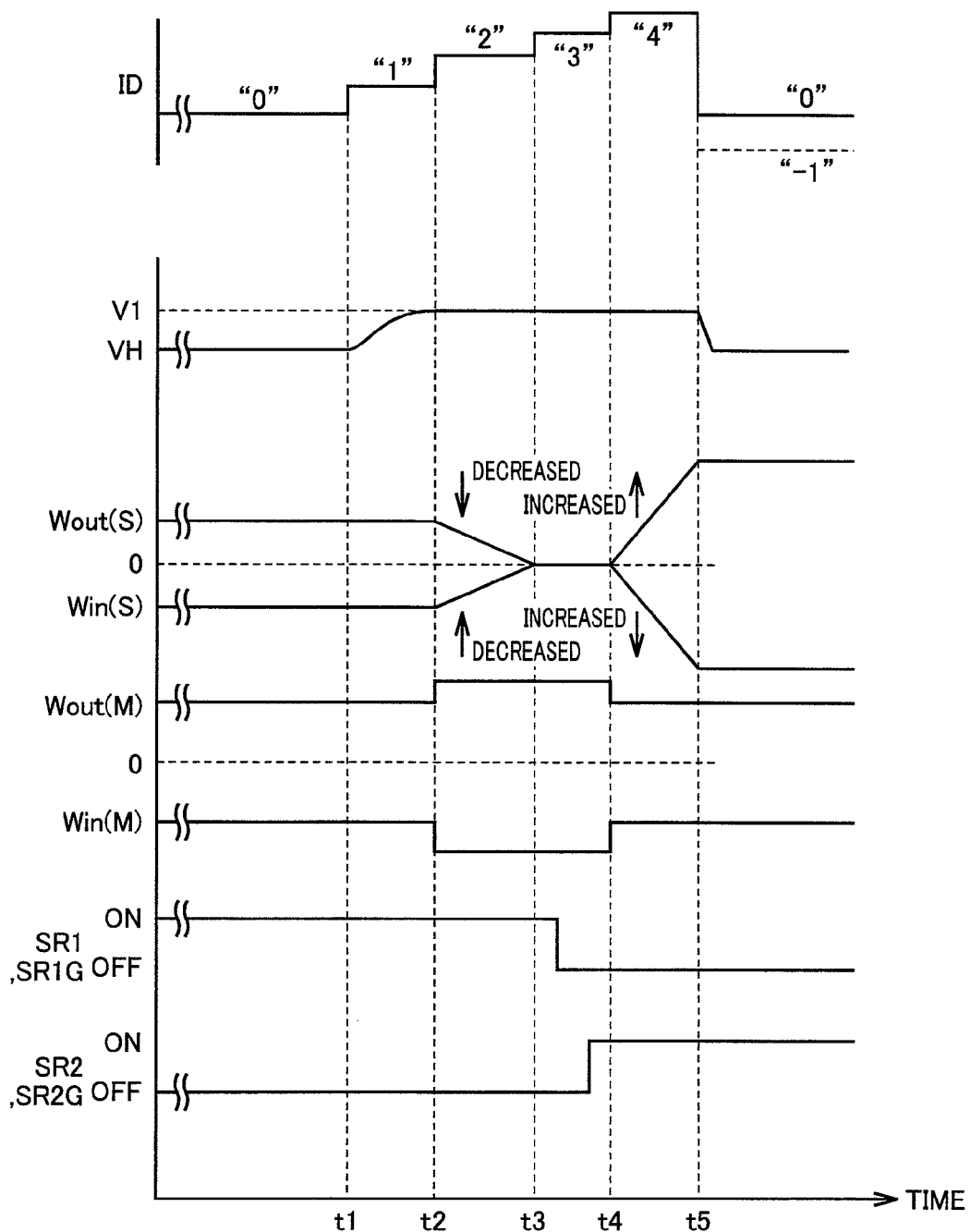
FIG. 14 is an operation waveform diagram in the process for switching a selected sub power storage device in the power supply system of the electrically powered vehicle according to an embodiment of the present invention.

FIG. 14 shows an operation waveform diagram in the process for switching the selected sub power storage device in the power supply system of the electrically powered vehicle according to the embodiment of the present invention described with reference to FIGS. 8 to 12.

With reference to FIG. 14, during a period until time t1 when ID=0, the switching determination process is performed periodically as predetermined, based on the SOC of the currently selected sub power storage device (e.g., battery BB1). Note that it is assumed that flag FLG in the ON state permits switching of a selected sub power storage device.

At time t1, in response to lowering in the SOC of battery BB1, the switching determination process (step S100) is performed to issue a request to switch selected sub power storage device BB and ID=1 is also set to start the switching process.

Thus, the pre-switching voltage step-up process (step S200) is performed and converter 12A increases voltage VH on electric power feeding line PL2 toward predetermined voltage V1. Processing for stepping up voltage on electric power feeding line PL2 is completed at time t2, and accordingly, the ID is changed from 1 to 2.

When ID=2 is set, the electric power limit modification process (S300) is performed to temporarily relax charging and discharging to/from main power storage device BA. Namely, temporary increase in absolute values of upper limits on electric power input/output Win(M), Wout(M) is started. In addition, upper limits on electric power input/output Win(S), Wout(S) to/from selected sub power storage device BB are decreased toward 0 gradually at a fixed rate. It is noted that, during this period, converter 12B is controlled to stop charging/discharging to/from the currently selected sub power storage device (battery BB1). Alternatively, converter 12B may be shut down from time t1.

At time t3, upper limits on electric power input/output Win(S), Wout(S) to/from selected sub power storage device BB are lowered to 0, and in response, the ID is changed from 2 to 3. Once ID=3 is set, the process for switching connection of the sub power storage device starts. More specifically, with converter 12B being shut down, relays SR1, SR1G are turned off and thereafter relays SR2, SR2G are turned on. Then, when the process for switching connection by means of the relay is completed and battery BB2 which is a newly selected sub power storage device is connected to converter 12B, converter 12B is restarted. By completing this connection switching process, the ID is changed from 3 to 4 at time t4.

When ID=4 is set, upper limits on electric power input/output Win(S), Wout(S) to/from selected sub power storage device BB are gradually increased at a fixed rate, so that use of battery BB2 which is a newly selected sub power storage device is started. Accordingly, temporary relaxation of charging and discharging restriction on main power storage device BA is ended and Wout(M), Win(M) are basically caused to return to the values at time t2 and before.

Then, when Win(S), Wout(S) of selected sub power storage device BB return to original values corresponding to Wout, Win of battery BB2 at time t5 respectively, return to ID=0 is made. Then, the processing for stepping up voltage on electric power feeding line PL2 is also stopped.

Thus, a series of processes for switching the selected sub power storage device ends and a state that normal electric power supply and electric power collection with the use of selected sub power storage device BB (battery BB2) can be carried out is reproduced.

At time t5, when there is no possibility of the switching process as a result of determination as to the possibility of the process for further switching the sub power storage device during the operation of the vehicle as described in connection with FIG. 13, load subsequently imposed on control device 30 can be alleviated by setting ID=−1.

Figure 15:
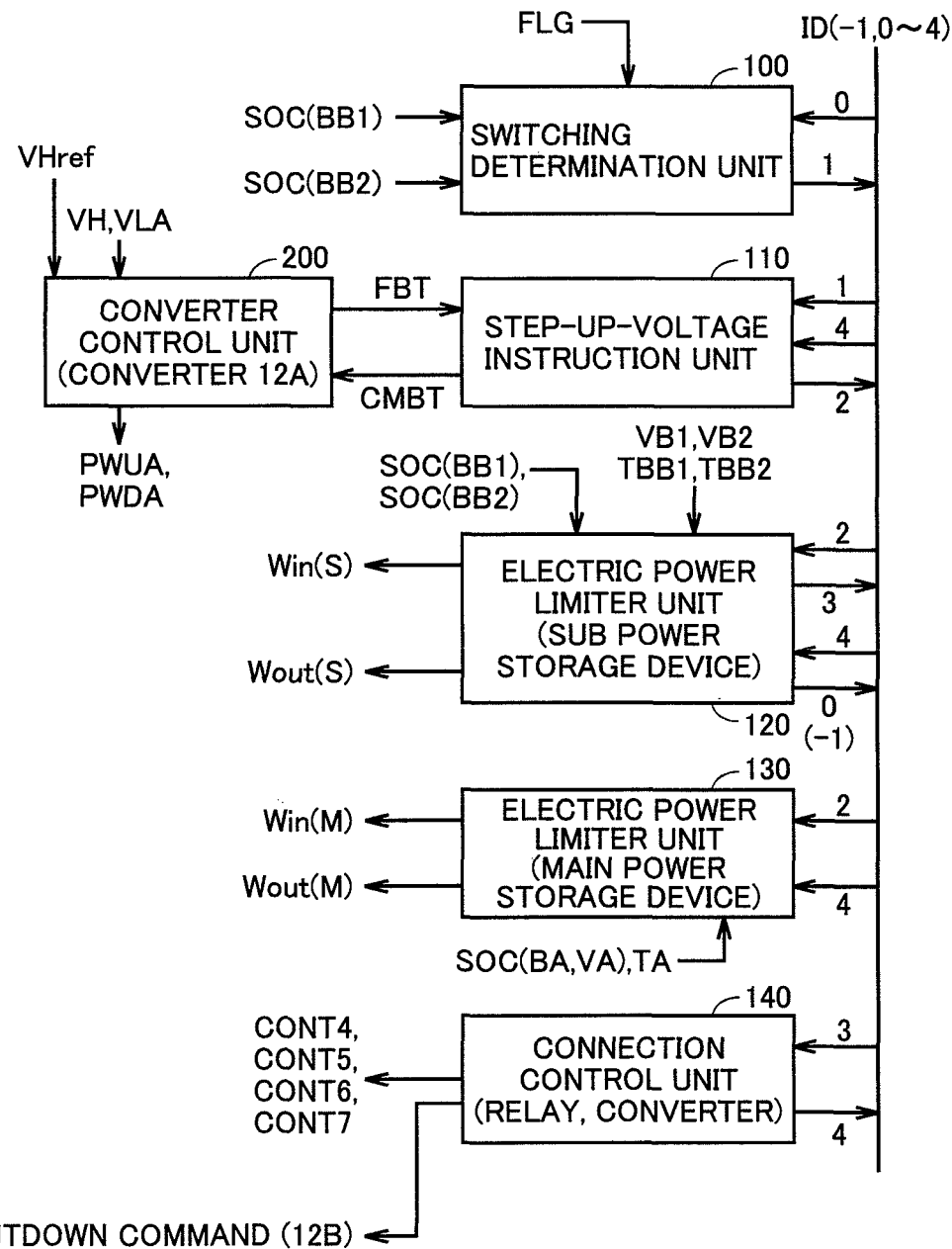
FIG. 15 is a functional block diagram for illustrating a configuration of a switching control unit 51.

A configuration of switching control unit 51 will now be described using FIG. 15. With reference to FIG. 15, switching control unit 51 includes a switching determination unit 100, a step-up-voltage instruction unit 110, electric power limiter units 120, 130, a connection control unit 140, and a converter control unit 200. Step-up-voltage instruction unit 110, electric power limiter units 120, 130, connection control unit 140, and converter control unit 200 constitute a "connection switching unit" of the present invention.

Switching determination unit 100 receives SOC(BB1), SOC(BB2) indicating the states of charge respectively of batteries BB1, BB2 and determines whether the SOC of currently used selected sub power storage device BB is lower than a predetermined criterion value or not. When variable ID shared by the functional blocks is set to 0, switching determination unit 100 performs the determination process above in predetermined cycles.

When the selected sub power storage device should be switched and flag FLG is ON, switching determination unit 100 changes the ID from 0 to 1. Thus, a request for switching the selected sub power storage device is generated. In other words, switching determination unit 100 has a function corresponding to the process in step S100 in FIG. 8.

When a request is generated to switch the selected sub power storage device and ID=1 is set, step-up-voltage instruction unit 110 outputs a step-up voltage command signal CMBT to converter control unit 200 controlling converter 12A.

Converter control unit 200 generates control signals PWUA, PWDA for converter 12A based on voltages VH, VLA and voltage command value VHref, so that voltage VH on electric power feeding line PL2 reaches voltage command value VHref.

Furthermore, when step-up-voltage instruction unit 110 generates step-up voltage command signal CMBT, converter control unit 200 sets voltage command value VHref=V1 and generates control signal PWUA. If voltage sensor 13 detects voltage VH having reached predetermined voltage V1 continuously for at least a predetermined period of time, converter control unit 200 sets a flag FBT to ON indicating that stepping up voltage is completed.

In response to flag FBT set to ON, step-up-voltage instruction unit 110 sets ID=2 and continues to output step-up voltage command signal CMBT until a connection control unit 140, which will be described later, completes relay connection switching and ID=4 is set. In other words, step-up-voltage instruction unit 110 has a function corresponding to step S200 in FIG. 8 and step S540 in FIG. 13.

An electric power limiter unit 120 sets upper limits on electric power input/output Win(S), Wout(S) to/from selected sub power storage device BB. Normally, upper limits on electric power input/output Win(S), Wout(S) are set based on selected sub power storage device BB or battery's SOC (SOC (BB1) or SOC(BB2)), temperature (TBB1 or TBB2) and an output voltage (VB1 or VB2).

In the process for switching the selected sub power storage device, in contrast, when ID=2 is set, electric power limiter unit 120 decreases upper limits on electric power input/output Win(S), Wout(S) gradually at a fixed rate toward 0, and when Win(S), Wout(S) have reached 0, electric power limiter unit 120 changes the ID from 2 to 3. In addition, when connection control unit 140 sets ID=4, electric power limiter unit 120 increases upper limits on electric power input/output Win(S), Wout(S) to values corresponding to Win, Win of newly selected sub power storage device BB after switching. Then, when the increase processing is completed, ID is changed from 4 to 0.

Namely, the function of electric power limiter unit 120 corresponds to the processing in steps S320 to S340 in FIG. 11 and the processing in steps S520 to S540 in FIG. 13.

An electric power limiter unit 130 sets upper limits on electric power input/output Win(M), Wout(M) to/from main power storage device BA. Normally, upper limits on electric power input/output Win(M), Wout(M) are set based on main power storage device BA's SOC(BA), battery temperature TA, and output voltage VA.

In contrast, during the process for switching the selected sub power storage device, when ID=2 is set, electric power limiter unit 130 temporarily increases absolute values of upper limits on electric power input and output Win(M) and Wout(M), so as to temporarily relax charging and discharging restriction on main power storage device BA. Then, when connection control unit 140 sets ID=4, electric power limiter unit 130 causes upper limits on electric power input and output Win(M) and Wout(M) to return to normal values.

Namely, the function of electric power limiter unit 130 corresponds to the processing in step S310 in FIG. 11 and the processing in step S510 in FIG. 13.

When electric power limiter unit 120 sets ID=3, connection control unit 140 generates a command to shut down converter 12B, and also generates relay control signals CONT4 to CONT7 to switch connection between converter 12B and sub power storage devices BB1, BB2. For example, when selected sub power storage device BB is switched from battery BB1 to battery BB2, relay control signals CONT4 to CONT7 are generated to turn off relays SR1, SR1G and turn on relays SR2, SR2G. Once this relay connection switching process is completed, connection control unit 140 stops the shutdown command described above to restart converter 12B, and changes the ID from 3 to 4.

The function of connection control unit 140 corresponds to the process in step S400 in FIG. 8 (the processes in S405 to S450 in FIG. 10).

In contrast, in the present embodiment, the switching control above is not carried out in the HV mode. Furthermore, in the HV mode, distribution of driving power between engine 4 and motor-generator MG2 is controlled to maintain the batteries' SOC at a target value.

Figure 16:
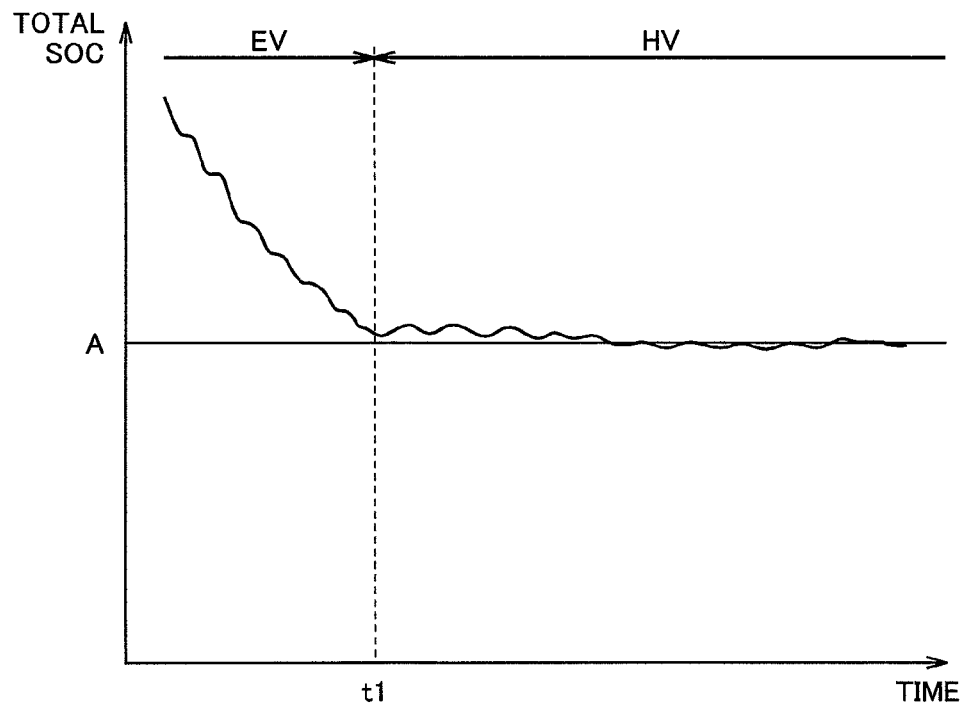
FIG. 16 illustrates control of batteries' SOC in an HV mode.

FIG. 16 is a diagram illustrating control of batteries' SOC in the HV mode.

With reference to FIG. 16, prior to time t1, the travel mode of electrically powered vehicle 1 is the EV mode. In this case, although regenerative braking of motor-generator MG2 charges the main power storage device and a selected sub power storage device, basically, electric power is supplied from the main power storage device and the selected sub power storage device to motor-generator MG2 to cause motor-generator MG2 to generate power to drive the vehicle. Thus, the total SOC (batteries' SOC) lowers over time. When the HV mode is selected at time t1, traveling control unit 250 (see FIG. 5) maintains the total SOC at a target value A. This target value may be a predetermined value, or may be the SOC value at time t1, for example.

However, even if control for maintaining the total SOC value is carried out, there may be possible lowering of the value for a reason such as the vehicle's traveling condition. In this case, it is possible that the selected sub power storage device has an SOC value below a threshold value used for determination as to whether switching should be made or not.

Figure 17:
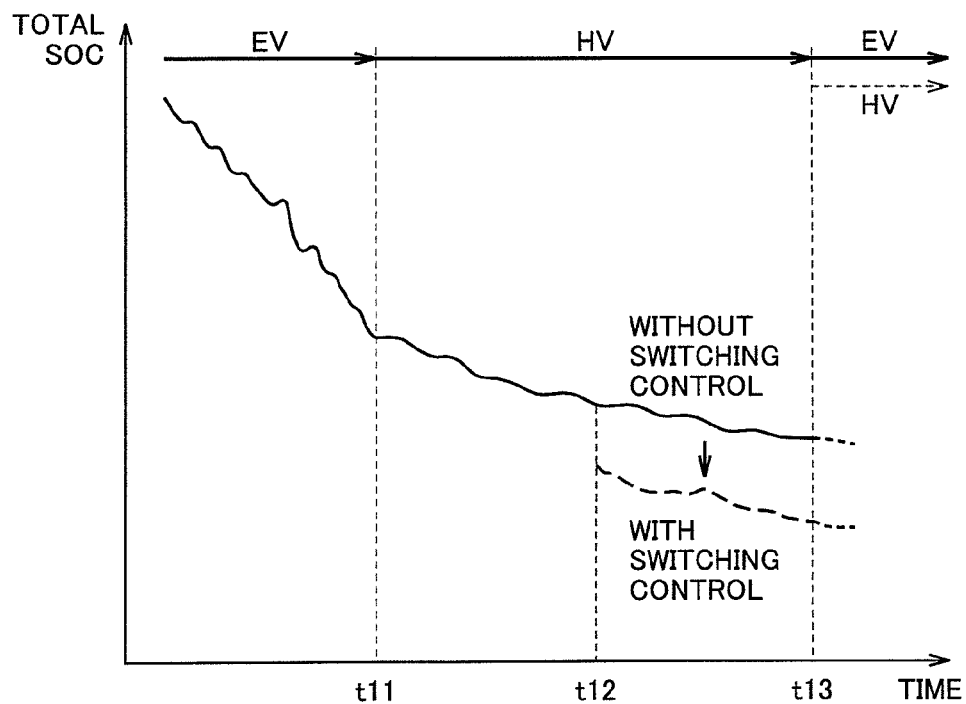
FIG. 17 illustrates a state in which the total SOC has lowered while electrically powered vehicle 1 is traveling in an HV mode.

FIG. 17 is a diagram illustrating a state in which the total SOC has lowered while electrically powered vehicle 1 is traveling in the HV mode. With reference to FIG. 17, when the HV mode is selected at time t11, traveling control unit 250 (see FIG. 5) seeks to maintain the total SOC value at a predetermined target value (target value A shown in FIG. 16). FIG. 17 shows a state in which the total SOC value gradually lowers. At time t12, the selected sub power storage device has an SOC value below a threshold value used for determination as to whether switching should be made or not.

It is assumed that at time t12, switching control of the selected sub power storage device is carried out. A spent sub power storage device has a low SOC value, and therefore, cannot be reconnected to converter 12B when the vehicle is traveling. Accordingly, electric power stored in the spent sub power storage device cannot be used for the vehicle to travel. As a result, the SOC value in total of the main power storage device and a plurality of sub power storage devices significantly (abruptly) drops at time t12.

Furthermore, during a period from time t12 to time t13, the total SOC value continues to lower. Meanwhile, at time t13, a user selects the EV mode. For example, the travel mode could be switched from the HV mode to the EV mode when a user wishes to cause electrically powered vehicle 1 to travel in the EV mode just before stopping electrically powered vehicle 1. It is conceivable that such switching of a travel mode is made for a reason such as reducing noise in residential areas late at night or early in the morning and reducing exhaust gas in indoor parking lots or garages.

However, since switching control of a selected sub power storage device was carried out at time t12, the total SOC value at the end of the HV mode (time t13) is far smaller than the value at the start of the HV mode (time t11). Therefore, a case occurs where despite the fact that a user has selected the EV mode, engine 4 operates so as to secure total required power Pttl of the vehicle. In other words, the HV mode is continued. In this case, a user's needs can no longer be satisfied.

In contrast, in the present embodiment, even when, in the HV mode, a selected sub power storage device has a lower SOC value than a criterion value for determination as to whether switching should be made or not, switching control is not carried out. Therefore, even if the total SOC value continues to lower in the HV mode, a significant drop due to switching of the selected sub power storage device can be avoided. Thus, the total SOC value continuously changes around time t12.

As a result, at the end of the HV mode (time t13), electric power necessary for EV traveling can be ensured. At this time, even if switching control of the selected sub power storage device is carried out because of the SOC of the selected sub power storage device below a criterion value for determination as to whether switching should be made or not, a sub power storage device newly connected to converter 12B stores sufficient electric power, which allows for EV traveling.

As above, in the present embodiment, connection of a plurality of sub power storage devices and an electric power feeding line is switched when it is determined that a selected sub power storage device should be switched. Switching of a selected sub power storage device is, however, prohibited when the travel mode is not the EV mode (i.e., when travel mode is the HV node). Charging and discharging to and from the main power storage device and a selected sub power storage device is controlled to keep constant value of state of charge of the main power storage device and a plurality of sub power storage devices when travel mode is the HV mode. When this control of charging and discharging is being carried out, switching of a selected sub power storage device is prohibited, even if the value indicating its state of charge lowers. Therefore, a significant (abrupt) drop of electric power available for an electrically powered vehicle caused by switching of a selected sub power storage device can be suppressed.

In the present embodiment, a configuration in which operation by a user switches the EV mode and the HV mode has been illustrated. However, for example, based on route information set by a navigation system, control device 30 may set a section for traveling in the EV mode and a section for traveling in the HV mode and switch the EV mode and the HV mode according to the setting.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A power supply system for an electrically powered vehicle incorporating a motor for generating power to drive the vehicle and an internal combustion engine configured to be able to generate said power to drive the vehicle independently of said motor,
said electrically powered vehicle having, as a travel mode, a first mode allowing said motor to generate said power to drive the vehicle and a second mode allowing said motor and said internal combustion engine to generate said power to drive the vehicle,
said power supply system comprising:
a main power storage device for supplying electric power to an inverter for driving and controlling said motor;
a plurality of sub power storage devices provided in parallel to each other; and
a switching control device configured to a selected sub power storage device for supplying electric power to said inverter, between said plurality of sub power storage devices,
said switching control device including:
a switching determination unit for determining whether said selected sub power storage device should be switched based on a state of charge of each of said plurality of sub power storage devices; and
a connection switching unit configured to switch said selected sub power storage device when said switching determination unit determines that said selected sub power storage device should be switched, and
said switching determination unit determining that said selected sub power storage device should not be switched regardless of said state of charge of said selected sub power storage device, while said travel mode is said second mode.

2. The power supply system for an electrically powered vehicle according to claim 1, wherein
said electrically powered vehicle further includes
a charging and discharging control unit for controlling charging and discharging to and from said main power storage device and said plurality of sub power storage devices in accordance with said travel mode, and
said switching determination unit receives a switching prohibit instruction from said charging and discharging control unit.

3. The power supply system for an electrically powered vehicle according to claim 2, wherein
remaining capacity of said main power storage device and said plurality of sub power storage devices as a whole is controlled by said charging and discharging control unit to be kept constant in said second mode.

4. The power supply system for an electrically powered vehicle according to claim 1, further comprising:
an electric power feeding line for feeding electric power to said inverter;
a first voltage converter provided between said electric power feeding line and said main power storage device, and configured to convert voltage therebetween bidirectionally;
a second voltage converter provided between said plurality of sub power storage devices and said electric power feeding line, and configured to convert voltage between said selected sub power storage device and said electric power feeding line bidirectionally; and
a connection unit provided between said plurality of sub power storage devices and said second voltage converter, and configured to selectively connect said selected sub power storage device to said second voltage converter.

5. An electrically powered vehicle comprising:
a motor for generating power to drive the vehicle;
an internal combustion engine configured to be able to generate said power to drive the vehicle independently of said motor;
an inverter for driving and controlling said motor;
a main power storage device for supplying electric power to said inverter;
a plurality of sub power storage devices provided in parallel to each other; and
a control device configured to switch a selected sub power storage device for supplying electric power to said inverter, between said plurality of sub power storage devices,
said control device including:
a switching determination unit for determining whether said selected sub power storage device should be switched based on a state of charge of each of said plurality of sub power storage devices; and
a connection switching unit configured to switch said selected sub power storage device when said switching determination unit determines that said selected sub power storage device should be switched,
said electrically powered vehicle having, as a travel mode, a first mode allowing said motor to generate said power to drive the vehicle and a second mode allowing said motor and said internal combustion engine to generate said power to drive the vehicle, and said switching determination unit determining that said selected sub power storage device should not be switched regardless of said state of charge of said selected sub power storage device, while said travel mode is said second mode.

6. The electrically powered vehicle according to claim 5, wherein
said control device further includes a charging and discharging control unit or controlling charging and discharging to and from said main power storage device and said plurality of sub power storage devices in accordance with said travel mode, and
said charging and discharging control unit generates a switching prohibit instruction while said travel mode is said second mode, and stops generation of said switching prohibit instruction while said travel mode is said first mode.

7. The electrically powered vehicle according to claim 6, wherein
said charging and discharging control unit controls said inverter and said internal combustion engine such that remaining capacity of said main power storage device and said plurality of sub power storage devices as a whole is kept constant in said second mode.

8. The electrically powered vehicle according to claim 6, further comprising
a travel mode setting device having a first state and a second state corresponding to said first and second modes, respectively, either one of said first and second states being configured to be manually settable, wherein
said charging and discharging control unit sets said travel mode based on said one state in said travel mode setting device.

9. The electrically powered vehicle according to claim 5, further comprising:
an electric power feeding line for feeding electric power to said inverter;
a first voltage converter provided between said electric power feeding line and said main power storage device, and configured to convert voltage therebetween bidirectionally;
a second voltage converter provided between said plurality of sub power storage devices and said electric power feeding line, and configured to convert voltage between said selected sub power storage device and said electric power feeding line bidirectionally; and
a connection unit provided between said plurality of sub power storage devices and said second voltage converter, and configured to selectively connect said selected sub power storage device to said second voltage converter.

10. A method for controlling an electrically powered vehicle, said electrically powered vehicle including:
a motor for generating power to drive the vehicle;
an internal combustion engine configured to be able to generate said power to drive the vehicle independently of said motor;
an inverter for driving and controlling said motor;
a main power storage device for supplying electric power to said inverter;
a plurality of sub power storage devices provided in parallel to each other; and
a control device configured to switch a selected sub power storage device for supplying electric power to said inverter, between said plurality of sub power storage devices,
said method comprising the steps of:
determining whether said selected sub power storage device should be switched based on a state of charge of each of said plurality of sub power storage devices; and
switching said selected sub power storage device when said step of determining determines that said selected sub power storage device should be switched,
said electrically powered vehicle having, as a travel mode, a first mode allowing said motor to generate said power to drive the vehicle and a second mode allowing said motor and said internal combustion engine to generate said power to drive the vehicle, and
wherein said step of determining determines that said selected sub power storage device should not be switched regardless of said state of charge of said selected sub power storage device, while said travel mode is said second mode.

11. The method for controlling an electrically powered vehicle according to claim 10,
further comprising the steps of:
setting said travel mode either in said first mode or in said second mode;
controlling charging and discharging to and from said main power storage device and said plurality of sub power storage devices in accordance with said travel mode set by said step of setting; and
prohibiting switching of said selected sub power storage device when said step of setting sets said travel mode in said second mode.

12. The method for controlling an electrically powered vehicle according to claim 11, wherein
said step of controlling controls said inverter and said internal combustion engine such that remaining capacity of said main power storage device and said plurality of sub power storage devices as a whole is kept constant in said second mode.

13. The method for controlling an electrically powered vehicle according to claim 10, wherein
said electrically powered vehicle further includes:
an electric power feeding line for feeding electric power to said inverter;
a first voltage converter provided between said electric power feeding line and said main power storage device, and configured to convert voltage therebetween bidirectionally;
a second voltage converter provided between said plurality of sub power storage devices and said electric power feeding line, and configured to convert voltage between said selected sub power storage device and said electric power feeding line bidirectionally; and
a connection unit provided between said plurality of sub power storage devices and said second voltage converter, and configured to selectively connect said selected sub power storage device to said second voltage converter.

* * * * *